United States Patent
Nakajima

(10) Patent No.: US 8,958,377 B2
(45) Date of Patent: Feb. 17, 2015

(54) TRANSMISSION DEVICE, TRANSMISSION METHOD AND TRANSMISSION SYSTEM

(75) Inventor: Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/576,854

(22) PCT Filed: Feb. 15, 2011

(86) PCT No.: PCT/JP2011/053610
§ 371 (c)(1),
(2), (4) Date: Aug. 2, 2012

(87) PCT Pub. No.: WO2011/108378
PCT Pub. Date: Sep. 9, 2011

(65) Prior Publication Data
US 2012/0314670 A1    Dec. 13, 2012

(30) Foreign Application Priority Data

Mar. 1, 2010    (JP) .................................. 2010-044348

(51) Int. Cl.
| | | |
|---|---|---|
| H04L 12/26 | (2006.01) |
| H04J 3/14 | (2006.01) |
| G08C 15/00 | (2006.01) |
| G06F 11/00 | (2006.01) |
| G01R 31/08 | (2006.01) |

(52) U.S. Cl.
USPC ............ 370/329; 370/217; 370/229; 370/259

(58) Field of Classification Search
USPC .................. 370/263–275, 311–329, 217–259
See application file for complete search history.

(56) References Cited

U.S. PATENT DOCUMENTS

| | | | |
|---|---|---|---|
| 6,628,609 B2 * | 9/2003 | Chapman et al. ............. | 370/229 |
| 6,970,466 B2 * | 11/2005 | Okubo ........................ | 370/395.1 |
| 7,177,268 B2 * | 2/2007 | Shinagawa .................... | 370/217 |
| 7,724,653 B2 * | 5/2010 | Konuma et al. ............... | 370/220 |
| 7,756,013 B2 * | 7/2010 | Honda .......................... | 370/218 |
| 7,995,463 B2 * | 8/2011 | Honma ......................... | 370/217 |

(Continued)

FOREIGN PATENT DOCUMENTS

| | | |
|---|---|---|
| GB | 2411081 B | 5/2006 |
| JP | 2000-59377 A | 2/2000 |

(Continued)

OTHER PUBLICATIONS

The international search report for PCT/JP2011/053610, dated May 24, 2011.

(Continued)

Primary Examiner — Man Phan
(74) Attorney, Agent, or Firm — Sughrue Mion, PLLC

(57) ABSTRACT

Disclosed is a transmission device that addresses the issue of alleviating the occurrence of delays in delivery, or the abandonment, of transmitted data in the transmission device when transmission capacity of the transmission device declines, as well as being easy to set up and maintain. The transmission device comprises a sorting means for assigning a first signal to either a first path or a second path on the basis of assignment information for assigning the first signal; a first transmitting means for transmitting the signal from among the first signal that is allocated to the first path upon the first path; and a second transmitting means for transmitting the signal from among the first signal that is allocated to the second path upon the second path.

15 Claims, 12 Drawing Sheets

(56) References Cited

U.S. PATENT DOCUMENTS

| | | | |
|---|---|---|---|
| 8,018,891 B2* | 9/2011 | Reddy et al. | 370/320 |
| 8,270,500 B2* | 9/2012 | Tidestav | 375/259 |
| 8,422,366 B2* | 4/2013 | Hirota et al. | 370/229 |
| 2003/0072261 A1 | 4/2003 | Shinagawa | |
| 2004/0202178 A1 | 10/2004 | Okubo | |
| 2008/0232375 A1* | 9/2008 | Hachiya et al. | 370/392 |
| 2011/0244813 A1* | 10/2011 | Kanai et al. | 455/88 |

FOREIGN PATENT DOCUMENTS

| | | |
|---|---|---|
| JP | 2000-216815 A | 8/2000 |
| JP | 2000216815 A | 8/2000 |
| JP | 2001-36526 A | 2/2001 |
| JP | 2002-26917 A | 1/2002 |
| JP | 2002026917 A | 1/2002 |
| JP | 2003-115948 A | 4/2003 |
| JP | 2003-124980 A | 4/2003 |
| JP | 2003115948 A | 4/2003 |
| JP | 2003124980 A | 4/2003 |
| JP | 2004349764 A | 12/2004 |
| JP | 2005217565 A | 8/2005 |
| JP | 2005-260904 A | 9/2005 |
| JP | 2006067239 A | 3/2006 |
| JP | 2008-104111 A | 5/2008 |

OTHER PUBLICATIONS

Japanese Office Action for JP Application No. 2012-503066 mailed on Oct. 29, 2013 with Partial English Translation.

* cited by examiner

FIG. 2A

IDENTIFICATION METHOD AT WIRELESS
TRANSMISSION CAPACITY OF 100 TO 150 Mbps

| CoS VALUE | PRIORITY | ALLOCATION CLASS |
|---|---|---|
| 1 | HIGH | CLASS A (WIRELESS DIRECTION) |
| 2 | ↑ | |
| 3 | | |
| 4 | | |
| 5 | | CLASS B (ADJACENT STATION DIRECTION) |
| 6 | | |
| 7 | ↓ | |
| 8 | LOW | |

FIG. 2B

IDENTIFICATION METHOD AT WIRELESS
TRANSMISSION CAPACITY OF LESS THAN 100 Mbps

| CoS VALUE | PRIORITY | ALLOCATION CLASS |
|---|---|---|
| 1 | HIGH | CLASS A (WIRELESS DIRECTION) |
| 2 | ↑ | |
| 3 | | CLASS B (ADJACENT STATION DIRECTION) |
| 4 | | |
| 5 | | |
| 6 | | |
| 7 | ↓ | |
| 8 | LOW | |

FIG. 6A

MAC FRAME IDENTIFICATION METHOD
AT THE TIME OF STORING MAC FRAME
WITH HIGH PRIORITY IN CLASS A BUFFER

| CoS VALUE | PRIORITY | ALLOCATION CLASS |
|---|---|---|
| 1 | HIGH | CLASS A (WIRELESS DIRECTION) |
| 2 | ↑ | |
| 3 | | CLASS B (WIRELESS DIRECTION) |
| 4 | | |
| 5 | | CLASS C (ADJACENT STATION DIRECTION) |
| 6 | | |
| 7 | ↓ | |
| 8 | LOW | |

FIG. 6B

MAC FRAME IDENTIFICATION METHOD
AT THE TIME OF STORING MAC FRAME
WITH HIGH PRIORITY IN CLASS B BUFFER

| CoS VALUE | PRIORITY | ALLOCATION CLASS |
|---|---|---|
| 1 | HIGH | CLASS A (WIRELESS DIRECTION) |
| 2 | ↑ | |
| 3 | | CLASS B (WIRELESS DIRECTION) |
| 4 | | |
| 5 | | CLASS C (ADJACENT STATION DIRECTION) |
| 6 | | |
| 7 | ↓ | |
| 8 | LOW | |

FIG. 8A

IDENTIFICATION METHOD AT WIRELESS
TRANSMISSION CAPACITY OF 100 TO 150 Mbps

| CoS VALUE | PRIORITY | ALLOCATION CLASS | ALLOCATION PRIORITY |
|---|---|---|---|
| 1 | HIGH | CLASS A (WIRELESS DIRECTION) | CLASS A1 (BAND GUARANTEE 100Mbps) |
| 2 | ↑ | | CLASS A2 |
| 3 | | | CLASS A3 |
| 4 | | | CLASS A4 |
| 5 | | CLASS B (ADJACENT STATION DIRECTION) | CLASS B1 |
| 6 | | | CLASS B2 |
| 7 | ↓ | | CLASS B3 |
| 8 | LOW | | CLASS B4 |

FIG. 8B

IDENTIFICATION METHOD AT WIRELESS
TRANSMISSION CAPACITY OF LESS THAN 100 Mbps

| CoS VALUE | PRIORITY | ALLOCATION CLASS | ALLOCATION PRIORITY |
|---|---|---|---|
| 1 | HIGH | CLASS A (WIRELESS DIRECTION) | CLASS A1 (BAND GUARANTEE 80Mbps) |
| 2 | ↑ | CLASS B (ADJACENT STATION DIRECTION) | CLASS B1 (BAND GUARANTEE 20Mbps) |
| 3 | | | CLASS B2 |
| 4 | | | CLASS B3 |
| 5 | | | |
| 6 | | | CLASS B4 |
| 7 | ↓ | | |
| 8 | LOW | | |

TRANSMISSION DEVICE, TRANSMISSION METHOD AND TRANSMISSION SYSTEM

TECHNICAL FIELD

The invention relates to a transmission device, a transmission method, and a transmission system, in particular a transmission device, a transmission method, and a transmission system which conduct transmission using a plurality of transmission paths.

BACKGROUND ART

A method of making a modulation scheme multiple-valued and a method of expanding a wireless band are known as a means for increasing a transmission capacity in a wireless transmission system. As an example of the method of making a modulation scheme multiple-valued, an adaptive modulation scheme is known. A wireless transmission device using the adaptive modulation scheme automatically changes a modulation scheme and a transmission rate depending on a condition of a wireless line. As a result, the wireless transmission device using the adaptive modulation scheme is capable of improving throughput of the wireless transmission system. However, in the adaptive modulation scheme, a modulation scheme having a small multiple-valued number is generally chosen, when a line condition is degraded. Accordingly, in the wireless transmission system employing the adaptive modulation scheme, the transmission capacity decreases as the line condition is degraded. As a result, in the wireless transmission system employing the adaptive modulation scheme, data is jammed on the transmission side, a delay time increases, and data overflowed from a buffer is lost.

As a technology for expanding the wireless band, MIMO (Multiple-Input Multiple—Output) and OFDM (Orthogonal Frequency Division Multiplexing) are known. However, since a high-level wireless control technology is required in order to realize these technologies, devices thereof become expensive. Link Aggregation defined in IEEE (Institute of Electrical and Electronics Engineers) 802.3ad is known as a technology of speeding up a transmission path by putting a plurality of links together. Since the technology, however, requires a protocol processing by Link Aggregation Control Protocol (LACP), the device is still expensive.

One of solutions to the problems described above is shown in a wireless transmission system in FIG. 11. FIG. 11 is a diagram illustrating a configuration of the wireless transmission system related to the invention.

An external LAN (Local Area Network) signal 100 (MAC frame based on IEEE802.3) enters a Layer 2 switch (hereinafter referred to as "L2SW") 50 from a user network 10. The L2SW 50 allocates the external LAN signal 100 to each MAC frame and outputs branched LAN signals 110-1 to 110-n to wireless transmission devices 60-1 to 60-n, respectively. Allocation of the frames may be conducted based on a value of a field defined in the MAC frame, like a MAC address, an IP address, and a VLAN ID (Virtual LAN Identifier).

The wireless transmission devices 60-1 to 60-n wireless-modulate inputted and branched LAN signals 110-1 to 110-n, respectively. The wireless transmission devices 60-1 to 60-n output the modulated signals to opposite wireless transmission devices 70-1 to 70-n as wireless signals 201-1 to 201-n, respectively. The wireless transmission devices 70-1 to 70-n demodulate received wireless signals 201-1 to 201-n to extract LAN signals, and output the extracted LAN signals to a L2SW 80 as branched LAN signals 510-1 to 510-n. The L2SW 80 puts the branched LAN signals 510-1 to 510-n together and outputs them to a user network 40 as an external LAN signal 500. A LAN signal is similarly transmitted from the user network 40 toward the user network 10. In the wireless transmission system shown in FIG. 11, if the number of wireless transmission devices between the L2SW 50 and the L2SW 80 is increased, a transfer capacity may be increased.

The L2SW 50 and the L2SW 80 include a Link Aggregation function without the LACP (Link Aggregation Control Protocol) as descriptions in Patent document 1. The L2SW 50 and the L2SW 80 achieve the Link Aggregation function without the LACP requiring complicated protocol processing. As described in Patent document 2 and Patent document 3, the wireless transmission devices 60-1 to 60-n, 70-1 to 70-n includes a function for putting a port of the branched LAN signal of the opposite wireless transmission device into linkdown when a linkdown state is detected at a port of the branched LAN signal.

Detecting quality degradation of the wireless signal either in the direction from the present wireless transmission device to the opposite wireless transmission device or in the reverse direction, the wireless transmission device puts the port of the branched LAN signal of the present wireless transmission device and the opposite wireless transmission device into the linkdown. As a result, the wireless transmission devices are capable of informing L2SW 50 and L2SW 80 of abnormality and stopping signal transmission.

If the L2SW in Patent document 1 is combined with the wireless transmission devices in Patent documents 2 and 3, it becomes possible to increase the transmission capacity without expanding the wireless band. Further complex LACP processing required for the Link Aggregation may be eliminated.

However, when a wireless system is configured by combining inventions described in the above Patent documents, the L2SW device becomes necessary in addition to the wireless transmission device. Therefore, total system costs increase. In addition, since the L2SW device is different from the wireless transmission device, construction and maintenance thereof is cumbersome, and it is difficult to standardize a monitoring control network.

A combination different from the combination of above Patent documents is described with reference to FIG. 12 and FIG. 13.

FIG. 12 is a diagram illustrating a configuration of a different wireless transmission system related to the invention. The wireless transmission system in FIG. 12 includes L2SW 50-1 to 50-n and L2SW 80-1 to 80-n by which L2SW 50 and 80 in FIG. 11 are replaced, and wireless transmission devices 60-1 to 60-n and 70-1 to 70-n. The wireless transmission devices 60-1 to 60-n face the wireless transmission devices 70-1 to 70-n and connect therewith, respectively.

The LAN signal 100 from the user network 10 is branched into n-signals for each MAC frame by the L2SW 50-1 which is connected with the first stage wireless transmission device 60-1. One LAN signal 110-1 is outputted to the wireless transmission device 60-1, and the other n−1 LAN signals 110-2 to 110-n are outputted to the adjacent n−1 wireless transmission devices 60-2 to 60-n. The L2SW 80-1 of the wireless transmission device 70-1 gathers the LAN signals 510-1 to 510-n which are transmitted through the wireless transmission devices 60-1 to 60-n and the wireless transmission devices 70-1 to 70-n. The L2SW 80-1 outputs the gathered LAN signals 510-1 to 510-n to the user network 40 as the external LAN signal 500.

As described, in the wireless transmission system in FIG. 12, the wireless transmission device connected with the user network connects with a plurality of wireless transmission devices adjacent thereto in a star arrangement. As a result, since the wireless transmission device connected with the user network gathers the other wireless transmission paths, extension of the transmission capacity is possible in proportion to the number of the adjacent wireless transmission devices. When a trouble occurs in the wireless transmission path, the wireless transmission device puts an internal LAN signal port connecting with the L2SW into linkdown and informs the L2SW of the trouble. The L2SW does not use the linkdown port for signal transmission based on the link aggregation function. As a result, signal transmission using only the wireless transmission device on the normal wireless transmission path becomes possible.

However, in the wireless transmission system in FIG. 12, connections from the adjacent plurality of wireless transmission devices concentrate on the wireless transmission device connecting with the user network. The wireless transmission device connecting with the user network requires interfaces, the number of which is equal to the number of the adjacent wireless transmission devices. As a result, in the wireless transmission system in FIG. 12, downsizing and price reduction of the device becomes difficult. The adjacent wireless transmission device connects only with the wireless transmission device connecting with the user network. Therefore, the adjacent wireless transmission device does not require the L2SW function. If the wireless transmission system in FIG. 12 is configured using the wireless transmission device with the L2SW function, the adjacent wireless transmission device includes the L2SW function which is not used. In the wireless transmission system in FIG. 12, therefore, price reduction of the adjacent wireless transmission device becomes difficult. If the wireless transmission system in FIG. 12 is configured by eliminating the L2SW function from the adjacent wireless transmission device, the wireless transmission device with the L2SW function and the wireless transmission device without the L2SW function exist in the wireless transmission system. In this case, construction and maintenance of the wireless transmission device becomes cumbersome.

FIG. 13 is a diagram illustrating another wireless transmission system related to the invention. The internal configuration of the wireless transmission system in FIG. 13 is similar to that of the wireless transmission system in FIG. 12. The wireless transmission system in FIG. 13 differs in connection between devices from the wireless transmission system in FIG. 12.

That is, in the wireless transmission system in FIG. 13, the wireless transmission device 60-1 connecting with the user network 10 connects with the adjacent wireless transmission device 60-2, and the wireless transmission device 70-1 connects with the adjacent wireless transmission device 70-2. In the wireless transmission system in FIG. 13, the wireless transmission device 60-2 connects with the adjacent wireless transmission device 60-3, and the wireless transmission device 70-2 connects with the adjacent wireless transmission device 70-3. In the wireless transmission system in FIG. 13, all the wireless transmission devices are similarly connected in cascade.

In the wireless transmission system in FIG. 13, when the adjacent wireless transmission devices are connected in cascade, the plurality of wireless transmission paths are put together and extension of the transmission capacity becomes possible depending on the number of the wireless transmission devices. In addition, the wireless transmission system in FIG. 13 detects abnormality in the wireless transmission path or a wireless transmission circuit, puts the internal LAN signal port which is connection with the L2SW into linkdown, and informs the L2SW of the abnormality. The L2SW does not use the linkdown port for signal transmission based on the link aggregation function. Therefore, signal transmission only using the wireless transmission device on the normal wireless transmission path may continue.

In the wireless transmission system in FIG. 13, since all the wireless transmission devices include the link aggregation function-enabled L2SW, price reduction of the device is difficult. When a simple and low price L2SW without the link aggregation function is applied to the adjacent wireless transmission device, the wireless transmission device connecting with the user network and the adjacent wireless transmission device which are different from each other are used, and therefore construction and maintenance thereof becomes cumbersome.

PRIOR ART DOCUMENT

Patent Document

[Patent document 1] Tokukai 2004-349764 A (paragraph [0034])
[Patent document 2] Tokukai 2005-217565 A (paragraph [0046])
[Patent document 3] Tokukai 2006-067239 A (paragraph [0037])

SUMMARY OF INVENTION

Technical Problem

As described above, a technology related to the invention includes the following problem.

That is, in the wireless transmission system employing the adaptive modulation scheme, data is jammed on the transmission side, a delay time increases, and data overflowed from a buffer is lost.

In addition, if a wireless system is realized by combining the inventions described in Patent documents 1 to 3, total system cost increases, construction and maintenance thereof is cumbersome.

Furthermore, in the wireless transmission system shown in FIG. 12 and FIG. 13, construction and maintenance thereof is cumbersome.

An object of the present invention is to solve a problem of alleviating the occurrence of delays in delivery, or the abandonment, of transmitted data in the transmission device, and to provide a transmission device, a transmission method, and a transmission system, in which construction and maintenance thereof are easy.

Solution to Problem

A transmission device of the present invention includes a sorting means for assigning a first signal to either a first path or a second path on the basis of assignment information for assigning the first signal, a first transmitting means for transmitting the signal from among the first signal that is allocated to the first path upon the first path, and a second transmitting means for transmitting the signal from among the first signal that is allocated to the second path upon the second path.

A transmission method of the present invention includes assigning a first signal to either a first path or a second path on the basis of assignment information for assigning the first signal, transmitting the signal from among the first signal that is allocated to the first path upon the first path, and transmitting the signal from among the first signal that is allocated to the second path upon the second path.

Advantageous Effects of Invention

The present invention can alleviate the occurrence of delays in delivery, or the abandonment, of transmitted data in the transmission device, when the transmission capacity of the transmission device is reduced. The present invention can provide the transmission device, for which construction and maintenance are easy.

BRIEF DESCRIPTION OF DRAWINGS

FIG. 2A is a diagram illustrating an identification method of a MAC frame of the first exemplary embodiment of the present invention.

FIG. 2B is a diagram illustrating an identification method of a MAC frame of the first exemplary embodiment of the present invention.

FIG. 6A is a diagram illustrating an identification method of a MAC frame of the third exemplary embodiment of the present invention.

FIG. 6B is a diagram illustrating an identification method of a MAC frame of the third exemplary embodiment of the present invention.

FIG. 8A is a diagram illustrating a MAC frame identification method of the fourth exemplary embodiment of the present invention.

FIG. 8B is a diagram illustrating a MAC frame identification method of the fourth exemplary embodiment of the present invention.

DESCRIPTION OF EMBODIMENTS

First Exemplary Embodiment

A first exemplary embodiment of the present invention is described below using FIG. 1 to FIG. 3.

Figure 1:
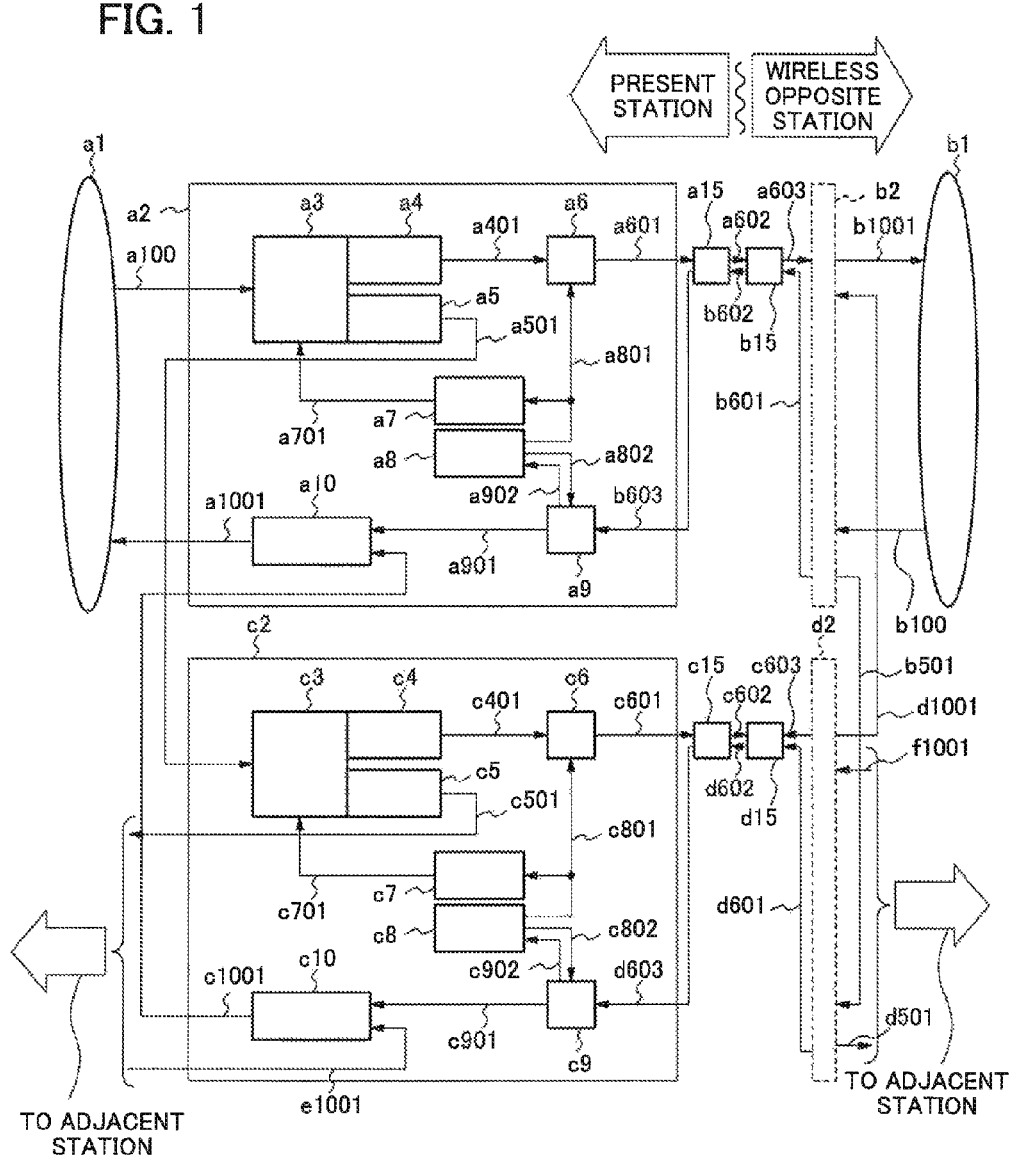
FIG. 1 is a first diagram illustrating a configuration of a wireless transmission system of a first exemplary embodiment of the present invention.

FIG. 1 is a first diagram illustrating a configuration of a wireless transmission system of a first exemplary embodiment of the invention.

The wireless transmission system described in FIG. 1 includes user networks a1 and b1, and wireless transmission devices a2, b2, c2 and d2. The user network a1 and the user network b1 exchange data which is composed of a MAC (Media Access Control) frame through the wireless transmission devices each other.

A configuration of the wireless transmission devices a2 is described below. A configuration of each of the wireless transmission devices b2, c2 and d2 is the same as that of the wireless transmission devices a2. Accordingly, descriptions on the configurations of the wireless transmission devices b2, c2 and d2 are omitted.

The wireless transmission device a2 includes a frame sorting unit a3, a class A buffer a4, a class B buffer a5, and a wireless transmission unit a6. The wireless transmission device a2 further includes a sorting system determination unit a7, an adaptive modulation determination unit a8, a wireless reception unit a9 and a transmission buffer a10.

A transmission-reception antenna a15 connects with the wireless transmission unit a6 and the wireless reception unit a9.

The wireless transmission device a2 includes a wireless modulation function of an adaptive modulation scheme. Operations of the adaptive modulation scheme in the wireless transmission device a2 will be described afterwards.

The frame sorting unit a3 receives an external input LAN signal a100 from the user network a1. The frame sorting unit a3 sorts the external input LAN signal a100 received from the user network a1 into a wireless direction and an adjacent station direction on the basis of a frame identification method designated by a sorting system notification signal a701 from the sorting system determination unit a7.

Here, "wireless direction" means a direction of a path on which the MAC frame is transmitted from a present wireless transmission device as a wireless signal. "Adjacent station direction" means a direction of a path on which the MAC frame is transferred to an adjacent wireless transmission device (hereinafter referred to as "adjacent station").

The frame sorting unit a3 stores the MAC frame, which is sorted in the wireless direction, into the class A buffer a4, and stores the MAC frame, which is sorted in the adjacent station direction, into the class B buffer a5.

The class A buffer a4 outputs the stored MAC frame to the wireless transmission unit a6 as a wireless transmission LAN signal a401. The wireless transmission unit a6 modulates the wireless transmission LAN signal a401 on the basis of the modulation scheme designated by a modulation scheme notification signal a801 received from the adaptive modulation determination unit a8 and performs frequency conversion to generate a wireless signal a601. The transmission-reception antenna a15 transmits a wireless signal a601 to the wireless transmission device b2 which is the wireless opposite station as a wireless signal a602. A transmission-reception antenna b15 connecting with the wireless transmission device b2 which is the wireless opposite station transmits the received wireless signal a602 to the wireless transmission device b2 as a wireless signal a603. In the first exemplary embodiment, a case in which the wireless transmission unit a6 includes the transmission capacity of up to 150 Mbps is described as an example. Of course, the transmission capacity of the wireless transmission unit b6 is not limited to the value.

The class B buffer a5 outputs the stored MAC frame to the wireless transmission device c2 as an adjacent transmission LAN signal a501.

On the other hand, the transmission-reception antenna a15 receives the wireless signal b602 transmitted by the transmission-reception antenna b15 as a radio wave, and outputs it to the wireless reception unit a9 as a wireless signal b603. The wireless reception unit a9 frequency-converts and demodulates the wireless signal b603 received by the transmission-reception antenna a15.

The modulation scheme used for modulation of the wireless signal b603 is defined for each frame of the wireless signal b603. Regarding the wireless signal b603, information on the modulation scheme of the frame to be demodulated (hereinafter, referred to as "demodulation scheme information") is described as a modulation scheme signal a902 in the frame of the wireless signal b603 which is received prior to the frame to be demodulated. The wireless reception unit a9 extracts the modulation scheme signal a902 from the received wireless signal b603 and outputs it to the adaptive modulation determination unit a8.

The modulation scheme signal a902 includes information related to a modulation scheme used hereafter in the wireless transmission unit a6 (hereinafter, referred to as "modulation scheme information") in addition to the above described demodulation scheme information. The modulation scheme information will be described afterwards.

The adaptive modulation determination unit a8 generates a demodulation scheme notification signal a802 on the basis of the demodulation scheme information included in the modulation scheme signal a902 and outputs it to the wireless reception unit a9. The wireless reception unit a9 demodulates the frame of the wireless signal b603 using the demodulation scheme notification signal a802.

The wireless reception unit a9 outputs the demodulated LAN signal to the transmission buffer a10 as a wireless reception LAN signal a901. The transmission buffer a10 outputs an output LAN signal c1001 from the wireless transmission device c2 which is the adjacent station and the wireless reception LAN signal a901 to the user network a1 as an external output LAN signal a1001.

A configuration of each part of the wireless transmission device b2 is the same as that of the wireless transmission device a2. An explanation on each part of the wireless transmission device b2 and illustration of each part thereof in FIG. 1 are, therefore, omitted. Each part of the wireless transmission device b2 corresponding to each part of the wireless transmission device a2 is described by replacing "a" in the reference numerals in the wireless transmission device a2 by "b".

The transmission-reception antenna b15 connected to the wireless transmission device b2 receives the wireless signal a602 transmitted as a radio wave from the wireless transmission device a2 through the transmission-reception antenna a15, and outputs it as the wireless signal a603. The wireless reception unit b9 frequency-converts the wireless signal a603 received from the transmission-reception antenna b15 and demodulates it according to the modulation scheme described in the received signal. Further, the wireless reception unit b9 outputs the demodulated LAN signal to a transmission buffer b10 as a wireless reception LAN signal b901. The transmission buffer b10 outputs an output LAN signal d1001 from the wireless transmission device d2 which is the adjacent station and the wireless reception LAN signal b901 to the user network b1 as an external output LAN signal b1001.

Operations in the wireless transmission device a2, in which the modulation scheme used in the wireless transmission unit a6 is determined by the adaptive modulation scheme, are described. The wireless transmission device b2 determines the modulation scheme information which the wireless transmission device b2 transmits by overlaying on the wireless signal b603 on the basis of a reception result in the wireless reception unit b9 of the wireless signal a603 transmitted from the wireless transmission device a2. For example, if a reception condition of the wireless signal a603 is degraded in the wireless transmission device b2, the wireless transmission device b2 adds information indicating the modulation scheme with a smaller multi-value number to the modulation scheme signal a902 and transmits them by overlaying on the wireless signal b601. The wireless reception unit a9 extracts the modulation scheme signal a902 from the received wireless signal a603 and outputs it to the adaptive modulation determination unit a8.

The adaptive modulation determination unit a8 generates the modulation scheme notification signal a801 on the basis of the modulation scheme information included in the modulation scheme signal a902 extracted from the wireless signal b603, and outputs it to the sorting system determination unit a7 and the wireless transmission unit a6. The adaptive modulation determination unit a8 generates the demodulation scheme notification signal a802 demodulating the frame of the wireless signal b603 continuously received on the basis of the modulation scheme information included in the modulation scheme signal a902 and outputs it to the wireless reception unit a9.

Tolerance to degradation of the reception condition is generally improved, as the multi-value number of the modulation scheme becomes small. Accordingly, even if the condition of the wireless transmission path is degraded, transmission may be continued without fault by employing the modulation scheme with a smaller multi-value number. As the multi-value number of the modulation scheme becomes small, data volume which can be transmitted per one-time modulation decreases, and accordingly the transmission capacity of the wireless transmission path is reduced.

When the reception condition of the wireless signal a603 is improved in the wireless transmission device b2, the wireless transmission device b2 transmits the modulation scheme signal a902 indicating the modulation scheme with the larger multi-value number by overlapping on the wireless signal b601.

As a result, the wireless transmission device a2 is capable of performing transmission with the modulation scheme having the multi-value number suitable for the condition of the wireless transmission path.

The sorting scheme determination unit a7 generates the sorting scheme notification signal a701 designating the frame identification method on the basis of the modulation scheme notification signal a801, and informs the frame sorting unit a3 of it. Details of the frame identification method will be described afterwards.

A sorting scheme of the MAC frame in the frame sorting unit a3 is explained. Frame sorting is performed using a value of an arbitrary field defined in the MAC frame. As a type of the field, MAC DA (Destination Address), MAC SA (Source Address), VLAN CoS (Virtual LAN Class of Service), VLAN ID, and the like, are known. Further, as a type of the field, IPv4 (Internet Protocol version 4) SA, IPv4 DA, IPv6 SA, IPv6 DA, MPLS (Multiprotocol Label Switching) ID, and the like, are also known. A characteristic value may be extracted from the value of the field using a hash function, and sorting of the MAC frame may be performed using the characteristic value, on the basis of the number of paths to be allocated. Sorting of the MAC frame may be performed on the basis of the result of comparison of the value of the field with a threshold value, or the result of pattern-matching on the value of the field.

Identification in the VLAN CoS (Virtual LAN Class of Service) field is described below with reference to FIG. 2A and FIG. 2B.

FIG. 2A and FIG. 2B are diagrams illustrating the identification methods of the MAC frame. The identification method of the MAC frame in FIG. 2A and FIG. 2B shows a correspondence relation between the values of the CoS field of the MAC frame and buffer classes to be allocated (A or B). In FIG. 2A and FIG. 2B, "CoS value" is the CoS value written in the MAC frame, and "allocation class" is a class of the buffer which is allocated to the value of the CoS field.

The MAC frame whose allocation class is the class A is stored in the class A buffer and outputted toward the wireless transmission unit a6. The MAC frame allocated to the class B is stored in the class B buffer and outputted toward the frame sorting unit c3 of the wireless transmission device c2.

FIG. 2A illustrates the identification method of the MAC frame with the wireless transmission capacity of the wireless transmission unit a6 which ranges from greater than or equal to 100 Mbps to smaller than or equal to 150 Mbps. When the wireless transmission capacity is greater than or equal to 100 Mbps and smaller than or equal to 150 Mbps, the MAC frame with the CoS values of 1 to 4 is allocated to the class A (wireless direction) and the MAC frame with the CoS values of 5 to 8 is allocated to the class B (adjacent station direction).

On the other hand, FIG. 2B illustrates the identification method of the MAC frame with the wireless transmission capacity which is smaller than 100 Mbps. FIG. 2B illustrates that when the wireless transmission capacity is smaller than 100 Mbps, the MAC frame whose CoS value is 1 or 2 is allocated to the class A (wireless direction) and the MAC frame whose CoS value is 3 to 8 is allocated to the class B (adjacent station direction).

When the modulation scheme notification signal a801 designates the modulation scheme in which the wireless transmission capacity is greater than or equal to 100 Mbps and smaller than or equal to 150 Mbps, the sorting scheme determination unit a7 chooses the identification method corresponding to the wireless transmission capacity of greater than or equal to 100 Mbps and smaller than or equal to 150 Mbps. The sorting scheme determination unit a7 transmits the sorting scheme notification signal a701 to the frame sorting unit a3 in order to apply the identification method corresponding to the wireless transmission capacity of greater than or equal to 100 Mbps and smaller than or equal to 150 Mbps to MAC frame allocation.

If the reception condition of the wireless signal a603 is degraded in the wireless transmission device b2, modulation scheme information included in the modulation scheme signal a902 changes. The adaptive modulation determination unit a8 generates the modulation scheme notification signal a801 on the basis of the modulation scheme information so that the modulation scheme in the wireless transmission unit a6 is switched into the modulation scheme with the multi-value number smaller than that of the current modulation scheme. Accordingly, the wireless transmission capacity of the wireless signal a601 of the wireless transmission device a2 is reduced.

If the wireless transmission capacity becomes 80 Mbps due to change of the modulation scheme, the sorting scheme determination unit a7 detects that the wireless transmission capacity becomes smaller than 100 Mbps, on the basis of the modulation scheme notification signal a801. The sorting scheme determination unit a7 outputs the sorting scheme notification signal a701 including information indicating the change of the wireless transmission capacity to the frame sorting unit a3.

If the wireless transmission capacity becomes 80 Mbps, the sorting scheme notification signal a701 instructs the frame sorting unit a3 to choose the identification method in which the wireless transmission capacity is smaller than 100 Mbps and to apply it to MAC frame allocation. Accordingly, the frame sorting unit a3 sorts the MAC frame into the class A (wireless direction) only when the CoS value of the MAC frame is 1 or 2, according to the identification method shown in FIG. 2B. When the CoS value takes the other value, the frame sorting unit a3 sorts all the MAC frames into the class B (adjacent station direction).

As a result, if the wireless transmission capacity becomes 80 Mbps, MAC frames sorted into the class A buffer decreases compared with the case in which the wireless transmission capacity of the wireless signal a601 is greater. Therefore, the MAC frames which are transmitted as the wireless signal a601 through the wireless transmission unit a6 decrease. When the wireless transmission capacity of the wireless signal a601 is reduced, occurrence of MAC frame jam and packet loss due to overflow in the wireless transmission device a2 are suppressed.

Next, operations of the wireless transmission devices c2 and d2 are described.

A configuration of the wireless transmission device c2 is the same as that of the wireless transmission device a2. Each part of the wireless transmission devices c2 and d2 which includes the same function as that of each part of the wireless transmission device a2 in FIG. 1 is described by replacing "a" in the reference numerals of the wireless transmission device a2 by "c" or "d". Descriptions on the function are, therefore, omitted.

The frame sorting unit c3 receives the adjacent transmission LAN signal a501 from the class B buffer a5 of the wireless transmission device a2. The frame sorting unit c3 sorts the adjacent transmission LAN signal a501 received from the wireless transmission device a2 into the wireless direction and the adjacent station direction on the basis of the frame identification method designated by the sorting scheme notification signal a701 from the sorting scheme determination unit c7. The frame sorting unit c3 stores the MAC frame which is sorted into the wireless direction into the class A buffer c4 and stores the MAC frame which is sorted into the adjacent station direction into the class B buffer c5.

The class A buffer c4 outputs the stored MAC frame to the wireless transmission unit c6 as a wireless transmission LAN signal c401. The wireless transmission unit c6 modulates the wireless transmission LAN signal c401 on the basis of the modulation scheme designated by the modulation scheme notification signal c801 received from the adaptive modulation determination unit c8, generates the wireless signal c601 through frequency conversion, and outputs it to the transmission-reception antenna. A transmission-reception antenna c15 transmits the wireless signal c601 to the wireless transmission device d2 which is the wireless opposite station as a wireless signal c602.

The class B buffer c5 outputs the stored MAC frame to an adjacent wireless transmission device which is not shown, as the adjacent transmission LAN signal c501.

If the wireless transmission device c2 does not connect with any adjacent wireless transmission device, the wireless transmission device c2 allocates all of the adjacent transmission LAN signals a501 received from the wireless transmission device a2 into the class A buffer.

The transmission-reception antenna c15 receives a wireless signal d602 transmitted by a transmission-reception antenna d15. A wireless reception unit c9 frequency-converts a wireless signal d603 outputted by the transmission-reception antenna c15 and demodulates it by the modulation scheme described in the received signal. The wireless reception unit c9 outputs the demodulated LAN signal to a transmission buffer c10 as a wireless reception LAN signal c901. The transmission buffer c10 outputs both an output LAN signal e1001 from an adjacent wireless transmission device which is not shown and the wireless reception LAN signal c901 to the transmission buffer a10 of the wireless transmission device a2 as the external output LAN signal c1001.

The wireless transmission LAN signal c401 outputted from the class A buffer c4 of the wireless transmission device c2 is received by the wireless transmission device d2. The transmission-reception antenna d15 of the wireless transmission device d2 receives a wireless signal c602 through the transmission-reception antenna c15 and outputs the received wireless signal c602 to a wireless reception unit d9 as a wireless signal c603. The wireless reception unit d9 frequency-converts the wireless signal c603 and demodulates it by the modulation scheme described in the received signal. The wireless reception unit d9 outputs the demodulated LAN signal to a transmission buffer d10 as a wireless reception LAN signal d901. The transmission buffer d10 outputs both an output LAN signal f1001 from a wireless transmission device f2 which is an adjacent station not shown and the wireless reception LAN signal d901 to the transmission buffer b10 of the wireless transmission device b2 as an external output LAN signal d1001.

The wireless transmission device c2 sorts the MAC frame by the same processing as the wireless transmission device a2, with respect to the adjacent transmission LAN signal a501 outputted from the class B buffer of the wireless transmission device a2. The wireless transmission device c2 modulates the wireless transmission LAN signal c401 outputted from the class A buffer c4 in the wireless transmission unit c6 and generates the wireless signal c601. The transmission-reception antenna c15 transmits the wireless signal c601 as the wireless signal c602.

The wireless transmission device d2 demodulates the wireless signal c603 which is received from the wireless transmission device c2 through the transmission-reception antennas c15 and d15, and outputs the demodulated LAN signal to the transmission buffer b10 of the wireless transmission device b2 as the external output LAN signal d1001. The transmission buffer b10 of the wireless transmission device b2 outputs both the output LAN signal d1001 from the wireless transmission device d2 which is the adjacent station and the wireless reception LAN signal b901 to the user network b1 as the external output LAN signal b1001.

As described above, the wireless transmission system of the first exemplary embodiment changes the identification method of the MAC frame in conjunction with the change of the modulation scheme, even if the wireless transmission capacity of the wireless transmission device is reduced due to the adaptive modulation function. As a result, the wireless transmission system of the first exemplary embodiment can reduce MAC frame allocation amount in the wireless direction in the wireless transmission device, when the wireless transmission capacity of the wireless transmission device is reduced. In the wireless transmission system of the first exemplary embodiment, the adjacent station allocates again the MAC frame which is allocated in the adjacent station direction in the wireless transmission device prior to the station.

In each wireless transmission device, the MAC frame which is allocated in the wireless direction is modulated by each wireless transmission unit and transmitted to the opposite wireless transmission device as a wireless signal.

The wireless transmission device which receives the wireless signal demodulates the wireless signal, couples the demodulated wireless signal and the output LAN signal transmitted from the adjacent station, and transmits them toward a higher-ranked wireless transmission device or the user network.

As a result, the wireless transmission system of the first exemplary embodiment can suppress MAC frame jam in the wireless transmission device and occurrence of packet loss due to overflow of a high priority packet, in the wireless transmission system employing the adaptive nodulation scheme.

If the MAC frame is transmitted using the adjacent wireless transmission devices c2 and d2, transmission delay between the wireless transmission devices a2 and c2, and transmission delay between the wireless transmission devices d2 and b2 are added. That is, if the adjacent wireless transmission devices c2 and d2 are employed, transmission delay increases compared with the transmission by the wireless transmission device of the first stage.

Accordingly, when the condition of the wireless transmission path is improved and the wireless transmission capacity of the wireless transmission device a2 increases, the wireless transmission device a2 may automatically use the identification method corresponding to the increased wireless transmission capacity.

For example, if the wireless transmission capacity increases while the identification method for the MAC frame shown in FIG. 2B is used, the wireless transmission device a2 may change the identification method for the MAC frame into the identification method shown in FIG. 2A. As a result, since many high priority packets may be transmitted by the wireless transmission device a2 close to the user network a1, increase of transmission delay in the wireless transmission system is suppressed.

Figure 3:
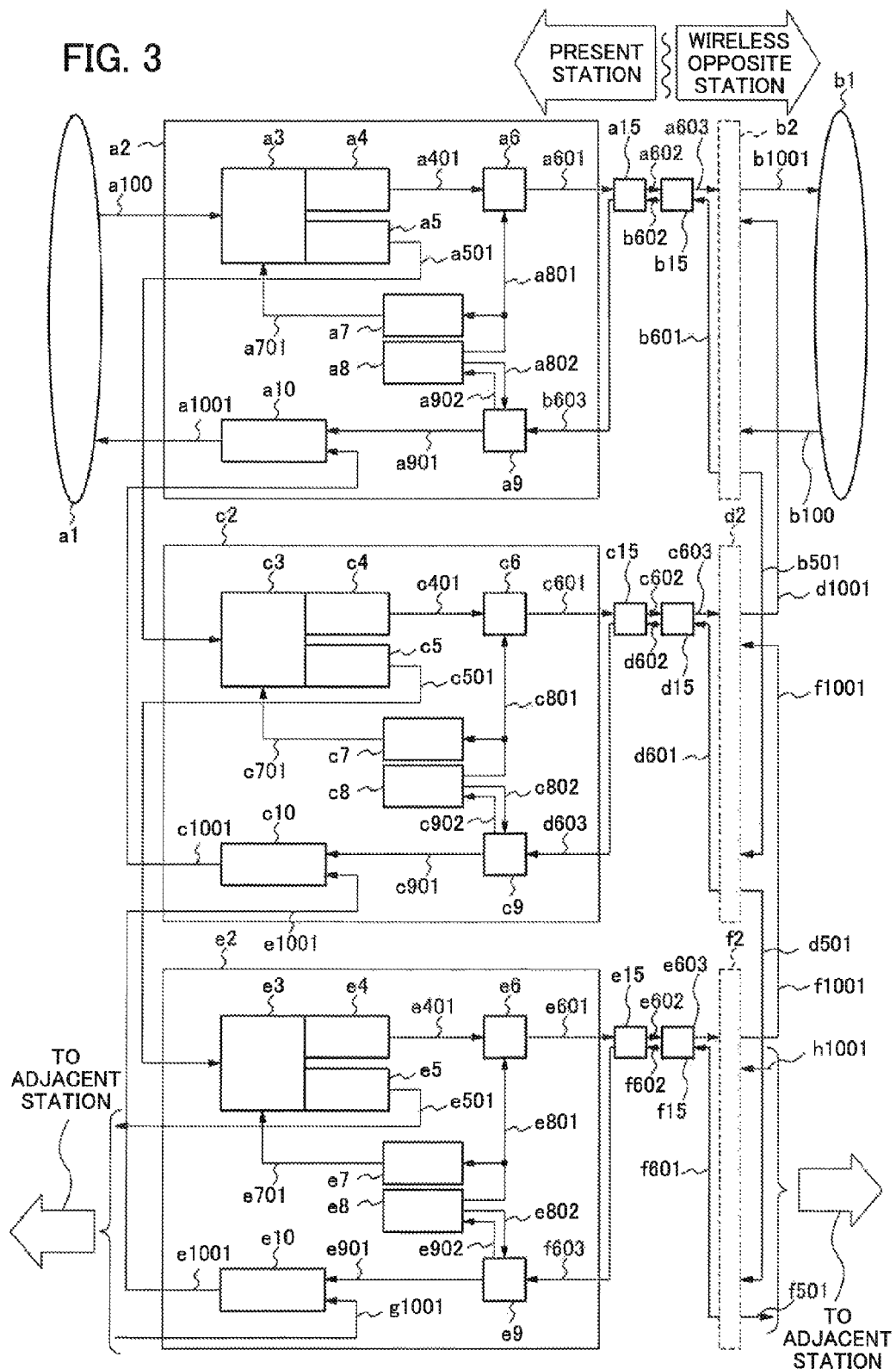
FIG. 3 is a second diagram illustrating a configuration of a wireless transmission system of the first exemplary embodiment of the present invention.

FIG. 3 is a second diagram illustrating the wireless transmission system of the first exemplary embodiment.

FIG. 1 illustrates the configuration in which the wireless transmission devices c2 and d2 are arranged as the wireless transmission device adjacent to the wireless transmission devices a2 and b2, respectively. On the contrary, FIG. 3 illustrates a configuration in which wireless transmission devices e2 and f2 adjacent to the wireless transmission devices c2 and d2 are further connected in series, respectively. In the following, in the wireless transmission system of the first exemplary embodiment, operations, which are performed when the wireless transmission device is further connected in series, are described.

In FIG. 3, an inner configuration and a function of each of the wireless transmission devices e2 and f2 is the same as that of the wireless transmission devices a2, b2, c2, and d2. In addition, operations of the wireless transmission devices e2 and f2 are the same as those of the wireless transmission devices c2 and d2 described in the first exemplary embodiment.

That is, a frame sorting unit e3 receives the adjacent transmission LAN signal c501 from the class B buffer c5 of the wireless transmission device c2. The frame sorting unit e3 sorts the adjacent transmission LAN signal c501 into the wireless direction and the adjacent station direction. The frame sorting unit e3 stores the MAC frame sorted in the wireless direction into a class A buffer e4 and stores the MAC frame sorted in the adjacent station direction into a class B buffer e5.

The class A buffer e4 outputs the stored MAC frame to the wireless transmission device e6 as a wireless transmission LAN signal e401. After modulating the wireless transmission LAN signal e401 on the basis of the modulation scheme designated by the modulation scheme notification signal e401, the wireless transmission device e6 generates a wireless signal e601 through frequency conversion and outputs it to a transmission-reception antenna e15. The transmission-reception antenna e15 transmits a wireless signal e602 to a wireless transmission device f2 which is a wireless opposite station as the wireless signal e602.

The class B buffer e5 outputs the stored MAC frame to an adjacent wireless transmission device not shown, as an adjacent transmission LAN signal e501.

When the wireless transmission device e2 connects with no adjacent wireless transmission device, the wireless transmission device e2 allocates all the adjacent transmission LAN signals c501 received from the wireless transmission device c2 to the class A buffer.

Meanwhile, the transmission-reception antenna e15 receives a wireless signal f603 from the wireless transmission device f2. A wireless reception unit e9 frequency-converts the wireless signal f603 and demodulates it in the modulation scheme described in the reception signal. The wireless reception unit e9 outputs the demodulated LAN signal to a transmission buffer e10 as a wireless reception LAN signal e901. The transmission buffer e10 outputs both the output LAN signal from an adjacent wireless transmission device not shown and the wireless reception LAN signal e901 to the transmission buffer c10 of the wireless transmission device c2 as an external output LAN signal e1001.

A transmission-reception antenna f15 of the wireless transmission device f2 receives the wireless signal e602 from the wireless transmission device e2. A wireless reception unit f9 performs frequency conversion and demodulation with respect to the wireless signal e602 received by the transmission-reception antenna f15. The wireless reception unit f9 outputs the demodulated LAN signal to a transmission buffer f10 as the wireless reception LAN signal e901. The transmission buffer f10 outputs both the output LAN signal from an adjacent wireless transmission device not shown and a wireless reception LAN signal f901 to the transmission buffer d10 of the wireless transmission device d2 as an external output LAN signal f1001.

As described, in the wireless transmission system shown in FIG. 3, by employing the wireless transmission devices e2 and f2, the wireless transmission system in which the parallel number is further increased can be configured. In the wireless transmission system shown in FIG. 3, MAC frame jam in the wireless transmission device and occurrence of packet loss due to overflow of the high priority packet can be avoided in the wireless transmission system employing the adaptive nodulation system.

In the wireless transmission system shown in FIG. 3, when the condition of the wireless transmission path is improved and the wireless transmission capacity increases, the high priority packet may be transmitted by the wireless transmission device close to the user network. As a result, also in the wireless transmission system shown in FIG. 3, increase of transmission delay in the wireless transmission system can be suppressed.

Regarding the first exemplary embodiment, in the wireless transmission system described using FIG. 1 and FIG. 3, if the MAC frames are transmitted in parallel by using a plurality of separate wireless transmission devices, the wireless transmission capacity may be increased. Consequently, only by changing the number of the wireless transmission devices, it is possible to respond to the request for increase and decrease of the transmission capacity of the whole of the wireless transmission system which occurs with expansion and reduction of the network.

In doing so, regardless of the number of the wireless transmission devices employed in the wireless transmission system, the wireless transmission devices with the same configuration are applicable. It is not necessary to arrange a high-price apparatus, like the L2SW, inside or outside the wireless transmission device. In the wireless transmission system of the first exemplary embodiment, system design, apparatus manufacturing, construction, and maintenance are easy, and the cost thereof may be suppressed.

Second Exemplary Embodiment

Figure 4:
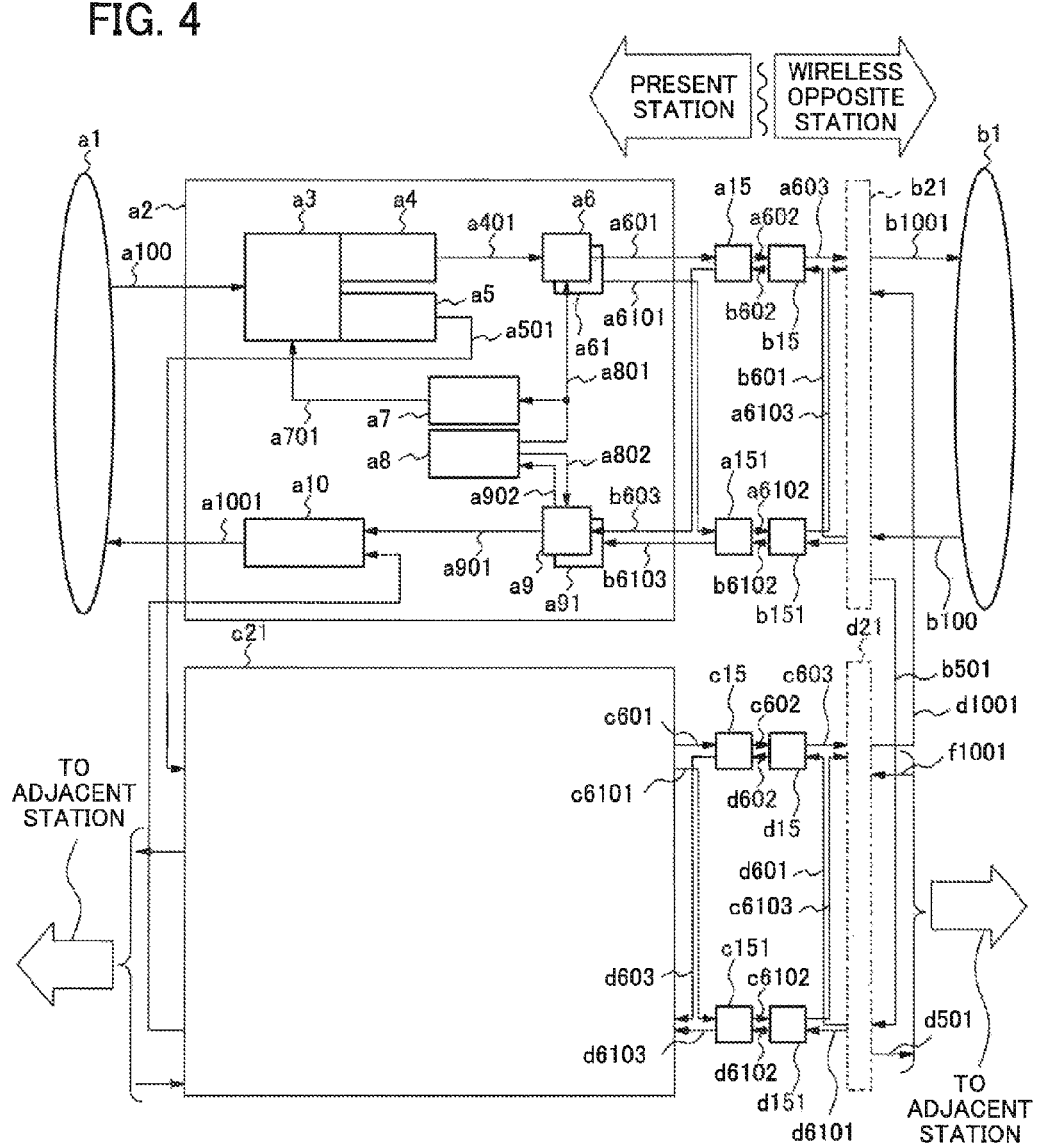
FIG. 4 is a diagram illustrating a configuration of a wireless transmission system of a second exemplary embodiment of the present invention.

FIG. 4 is a diagram illustrating a configuration of a wireless transmission system of a second exemplary embodiment of the present invention. Wireless transmission devices a21, b21, c21 and d21 in the wireless transmission system of the second exemplary embodiment shown in FIG. 4 differ in the wireless transmission unit and the wireless reception unit which are doubled from the wireless transmission devices a2, b2, c2 and d2 of the first exemplary embodiment in FIG. 1.

The wireless transmission device a21 is described below as an example. Descriptions thereof are applicable to the wireless transmission devices b21 to d21. The configuration and operations of the part other than the wireless transmission unit and the wireless reception unit are the same as those of the first exemplary embodiment. The inner configuration of the wireless transmission devices b21, c21, and d21 are not shown. The configuration and operations of each of the wireless transmission devices b21, c21, and d21 are the same as the wireless transmission device a21. Regarding the wireless transmission devices b21, c21, and d21, the same name as the wireless transmission device a21 is used and the reference code "a" is replaced by "b", "c", or "d".

The wireless transmission device a21 shown in FIG. 4 includes wireless transmission units a6 and a61. The wireless transmission device a21 includes wireless reception units a9 and a91.

The wireless transmission LAN signal a401 stored in the class A buffer enters the wireless transmission units a6 and a61. The wireless transmission units a6 and a61 transmit the inputted wireless transmission LAN signal a401 as wireless signals a602 and a6102 through transmission-reception antennas a15 and a151, respectively.

Transmission-reception antennas b15 and b151 of the wireless transmission device b21 which faces the wireless transmission device a21 receive the wireless signals a602 and a6102, respectively. The wireless reception units a9 and a91 output wireless signals a603 and a6103 received by the transmission-reception antennas b15 and b151 as wireless reception LAN signal b901 and b9101, respectively.

The wireless transmission system shown in FIG. 4 includes a redundant configuration of the wireless transmission units a6 and a61 and that of the wireless reception units b9 and b91. That is, normally, transmission is performed on the path in which the wireless transmission unit a6 transmits the wireless signal a602, and the wireless reception unit b9 receives the wireless signal a602.

When the wireless transmission unit a6, the transmission-reception antennas a15, the wireless reception unit b9 or transmission-reception antennas b15 gets out of order, a path is switched to the one in which the wireless transmission unit a61 works. The transmission-reception antenna a151 transmits the wireless signal a6101 generated by the wireless transmission unit a61 due to the path switching. The transmission-reception antenna b151 outputs the received wireless signal a602 to the wireless reception unit b91 as the wireless signal a603.

As described, the wireless transmission system of the second exemplary embodiment has an advantageous effect that, even when either the wireless transmission unit a6 or the wireless reception unit b9 goes out of order, transmission can be continued, by switching the path to the one including the wireless transmission unit a61 and the wireless reception unit b91. In this case, when disappearance of the received signal or degradation of the reception condition in the wireless reception unit b9 occurs, the transmission path may be switched to the path including the wireless transmission unit a61 and the wireless reception unit b91. As a result of the switch, if continuation of the transmission is possible, the transmission on the path including the wireless transmission unit a61 and the wireless reception unit b91 may be continued. That is, the wireless transmission system of the second exemplary embodiment has an effect that it can reduce the probability that communication is interrupted due to a device failure, degradation of a line condition, or the like, by switching the path to the one including the wireless transmission unit a61 and the wireless reception unit b91 when a reception condition of a wireless signal is degraded.

In addition, in the second exemplary embodiment, the wireless transmission unit a6 and the wireless reception unit a9 connect with the transmission-reception antenna a15, and the wireless reception unit a9 and the wireless reception unit a91 connect with the transmission-reception antenna a151. However, a transmission-reception antenna may be configured as one system, and both the wireless transmission units a6 and a61 may connect with the transmission-reception antenna a15.

Further, the wireless transmission system of the second exemplary embodiment is applicable to configurations of the first exemplary embodiment and the modified example thereof. The first exemplary embodiment and the modified example thereof in which the wireless transmission unit and the wireless reception unit include the redundant configuration have effects of both the wireless transmission system of the first exemplary embodiment and the wireless transmission system of the second exemplary embodiment.

Third Exemplary Embodiment

Figure 5:
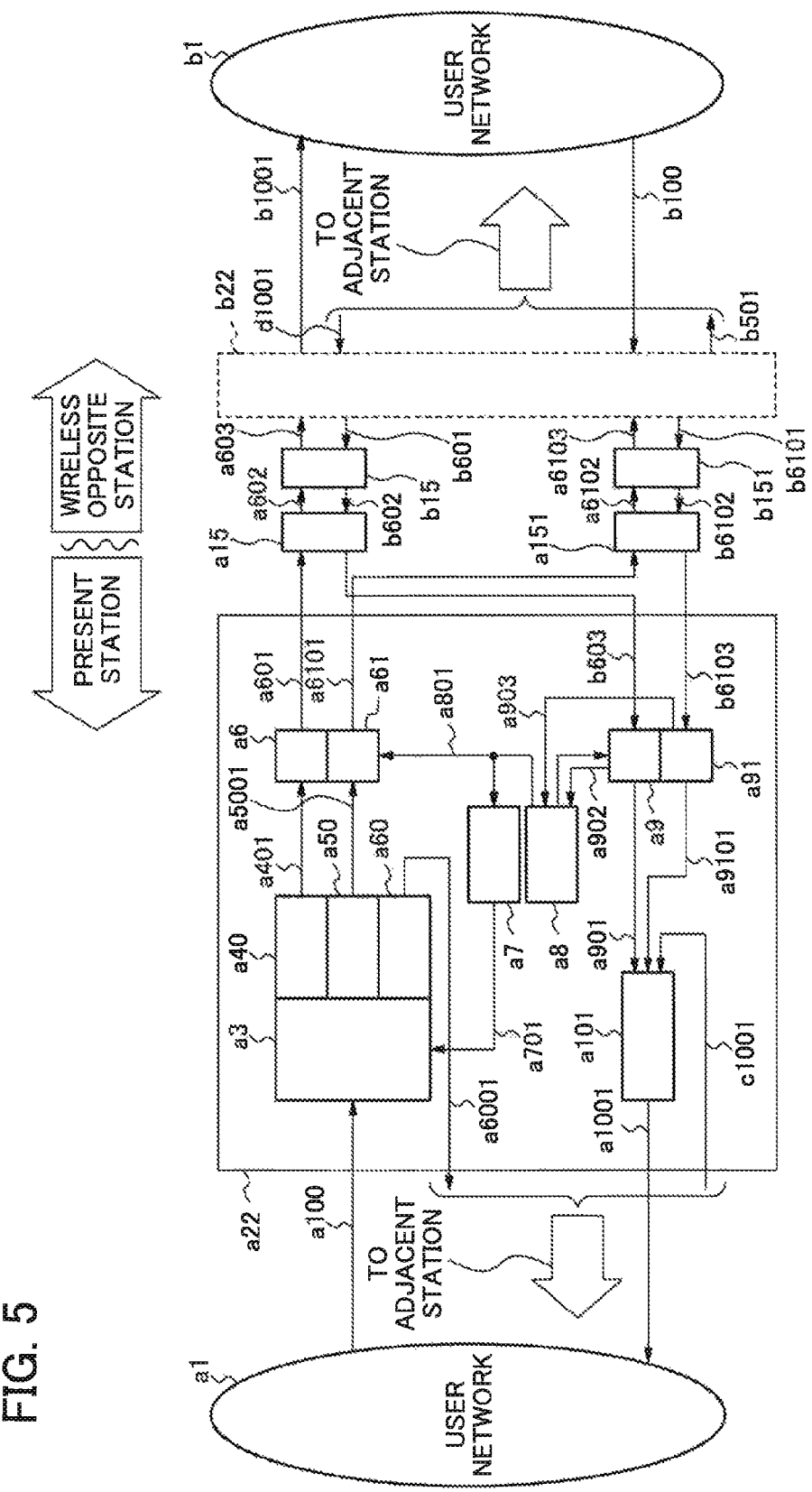
FIG. 5 is a diagram illustrating a configuration of a wireless transmission system of a third exemplary embodiment of the present invention.

FIG. 5 is a diagram illustrating a configuration of a wireless transmission system of a third exemplary embodiment of the present invention. Wireless transmission devices a22 and b22 in the wireless transmission system of a third exemplary embodiment of FIG. 5 differ in configurations of the wireless transmission unit and the wireless reception unit from the wireless transmission devices a21 and b21 in the second exemplary embodiment in FIG. 4.

The wireless transmission device a22 is described below as an example. An operation of each part of the wireless transmission device b22 is the same as that of the wireless transmission device a22. A configuration and an operation of the part other than the wireless transmission unit and the wireless reception unit are the same as those of the first exemplary embodiment.

In the wireless transmission device a22 shown in FIG. 5, the frame sorting unit a3 receives the external input LAN signal a100 from the user network a1. The frame sorting unit a3 stores the area where the external input LAN signal a100 to be stored in the class A buffer a40 or the class B buffer a50 which is the buffer in the wireless direction, or the class C buffer which is the buffer in the adjacent station direction, on the basis of the frame identification method designated by the sorting scheme notification signal a701.

The class A buffer a40 outputs the stored MAC frame to the wireless transmission unit a6 as the wireless transmission LAN signal a401. The wireless transmission unit a6 modulates the wireless transmission LAN signal a401 on the basis of the modulation scheme, used in the wireless transmission unit a6, designated by the modulation scheme notification signal a801 received from the adaptive modulation determination unit a8. The wireless transmission unit a6 frequency-converts the modulated wireless transmission LAN signal a401 and outputs the wireless signal a601. The transmission-reception antenna a15 transmits the frequency-converted wireless signal a601 to the wireless transmission device b22 which is the wireless opposite station as the wireless signal a602.

The class B buffer a50 outputs the stored MAC frame to the wireless transmission unit a61 as a wireless transmission LAN signal a5001. The wireless transmission unit a61 modulates the wireless transmission LAN signal a5001 on the basis of the modulation scheme, used in the wireless transmission unit a61, designated by the modulation scheme notification signal a801 received from the adaptive modulation determination unit a8. The wireless transmission unit a61 frequency-converts the modulated wireless transmission LAN signal a5001 and outputs a wireless signal a6101. The transmission-reception antenna a151 transmits the frequency-converted wireless signal a5001 to the wireless transmission device b22 which is the wireless opposite station as the wireless signal a6101.

In order to suppress interference between the wireless signal a602 and the wireless signal a6102 in the wireless transmission device b22, the wireless signal a602 and the wireless signal a6102 may be transmitted using carrier waves having different frequencies. Or, a transmission-reception antenna with high directionality is applicable to the transmission-reception antennas a15, a151, b15, and b151. In this case, the directionality is adjusted so that the transmission-reception antenna a15 faces the transmission-reception antenna b15, and the transmission-reception antenna a151 faces the transmission-reception antenna b151. Thereby, the transmission path between the transmission-reception antenna a15 and the transmission-reception antenna b15 may be spatially separated from the transmission path between the transmission-reception antenna a151 and the transmission-reception antenna b151. Even though the wireless signal a602 and the wireless signal a6102 employ the carrier wave with the same frequency, interference between the wireless signal a603 and the wireless signal a6103 in the wireless reception unit b9 or the wireless reception unit b91 may be reduced.

The class C buffer a60 outputs the stored MAC frame to the wireless transmission device c2 which is the adjacent station as the adjacent transmission LAN signal a6001.

On the other hand, the transmission-reception antenna a15 receives the wireless signal b61 from the wireless transmission device b22. The wireless reception unit a9 frequency-converts the wireless signal b603 outputted by the transmission-reception antenna a15 and demodulates it on the basis of the modulation scheme described in the reception signal. The wireless reception unit a9 outputs the demodulated LAN signal to the transmission buffer a10 as the wireless reception LAN signal a901.

The transmission-reception antenna a151 receives a wireless signal b6102 from the wireless transmission device b22. The wireless reception unit a91 frequency-converts a wireless signal b6103 outputted by the transmission-reception antenna a151 and demodulates it on the basis of the modulation scheme described in the reception signal. The wireless reception unit a91 outputs the demodulated LAN signal to the transmission buffer a10 as a wireless reception LAN signal a9101.

By employing the configuration which is the same as the configuration reducing the interference in the wireless transmission device b22 described above, interference between the wireless signal b602 and the wireless signal b6102 in the wireless transmission device a22 may be suppressed. That is, the wireless signal b601 and the wireless signal b6101 may be transmitted using carrier waves with different frequency. A transmission-reception antenna with high directionality is applicable if the wireless transmission device a22 and the wireless transmission device b22 include the transmission-reception antennas a15, a151, b15, and b151, respectively. If the transmission-reception antenna with high directionality is employed, even though the wireless signal b602 and the wireless signal b6102 employ the carrier wave with the same frequency, interference between the wireless signal b603 and the wireless signal b6103 in the wireless reception unit a9 or the wireless reception unit a91 may be reduced.

The transmission buffer a101 outputs the output LAN signal c1001 from wireless transmission device c22 which is the adjacent station and the wireless reception LAN signals a901 and a9101 to the user network a1 as the external output LAN signal a1001.

Next, a sorting scheme of the MAC frame in the frame sorting unit a3 is described.

As described above, the MAC frame stored in the class A buffer a40 is transmitted on the path in which the MAC frame is transmitted from the transmission-reception antenna a15 as the wireless signal a602 and received by the transmission-reception antenna b15 in the wireless transmission device b22 (hereinafter, referred to as "path A"). The MAC frame stored in the class B buffer a50 is transmitted on the path in which the MAC frame is transmitted from the transmission-reception antenna a151 as the wireless signal a6101 and reaches the wireless reception unit b91 through the transmission-reception antenna b151 in the wireless transmission device b22 (hereinafter, referred to as "path B").

The frame sorting unit a3 sorts a frame using the value of the arbitrary field defined in the MAC frame. As the type of fields, MACDA, MAC SA, VLAN CoS (VLAN ID), IPv4 SA, IPv4 DA, IPv6 SA, IPv6 DA, MPLS ID, and the like are known. A characteristic value is extracted from the value of the field using the hash function on the basis of the number of paths to be allocated, and sorting of MAC frame may be performed on the basis of the value. Otherwise, the sorting of the MAC frame may be performed on the basis of the result of comparison of the value of the field with a threshold value or the result of pattern-matching on the value of the field.

Identification on the VLAN CoS (Virtual LAN Class of Service) field is described below.

In the third exemplary embodiment, the frame sorting unit a3 stores the MAC frame with higher priority or higher importance of the MAC frame allocated in the wireless direction into the buffer connecting with the path with a good communication condition. That is, when the communication condition of the path A is better than the communication condition of the path B, the frame sorting unit a3 stores the MAC frame with higher priority or higher importance of the MAC frame allocated in the wireless direction into the class A buffer. On the contrary, when the communication condition of the path B is better than the communication condition of the path A, the frame sorting unit a3 stores the MAC frame with higher priority or higher importance of the MAC frame allocated in the wireless direction into the class B buffer.

FIG. 6A and FIG. 6B are diagrams illustrating an identification method of the MAC frame in the third exemplary embodiment of the invention. FIG. 6A and FIG. 6B illustrates the correspondence relation between the values of the CoS field of the MAC frame and buffer classes to be allocated. In FIG. 6A and FIG. 6B, "CoS value" is the CoS value written in the MAC frame, and "allocation class" is the class of the buffer which is allocated to the values of the CoS field (A, B, C).

In the identification method of the MAC frame shown in FIG. 6A, the MAC frame with higher priority or higher importance is stored in the class A buffer. In the identification method of the MAC frame shown in FIG. 6B, the MAC frame with higher priority or higher importance is stored in the class B buffer.

In FIG. 6A, the MAC frame with the CoS value of 1 or 2, that is, the MAC frame with high priority, is stored in the class A buffer a40 and transmitted on the path A. The MAC frame with the CoS value of 3 or 4, which is not allocated to the class A, among the MAC frames allocated in the wireless direction is stored the class B buffer a50 and transmitted on the path B.

In FIG. 6B, the MAC frame with the CoS value of 1 or 2, that is, the MAC frame with high priority, is stored in the class B buffer a50 and transmitted on the path B. The MAC frame with the CoS value of 3 or 4, which is not allocated to the class B, among the MAC frames allocated in the wireless direction is stored the class A buffer a40 and transmitted on the path A.

In both cases, a packet with CoS value of greater than or equal to 5 is allocated in the adjacent station direction as the class C.

The wireless reception unit a9 extracts the modulation scheme signal a902 from the wireless signal b603 received by the transmission-reception antenna a15 and outputs it to the adaptive modulation determination unit. The wireless reception unit a91 extracts the modulation scheme signal a903 from the wireless signal b6101 received by the transmission-reception antenna a151 and outputs it to the adaptive modulation determination unit.

The adaptive modulation determination unit a8 generates the modulation scheme notification signal a801 on the basis of information included in the modulation scheme signals a902 and a903 and outputs it to the sorting scheme determination unit a7 and the wireless transmission unit a6.

The modulation scheme notification signal a801 includes information indicating the modulation scheme to be employed with respect to the wireless transmission units a6 and a61.

The sorting scheme determination unit a7 generates the sorting scheme notification signal a701 designating the frame identification method on the basis of information included in the modulation scheme notification signal a801 and informs the frame sorting unit a3 of it. The sorting scheme notification signal a701 includes information designating the MAC frame identification method used by the frame sorting unit a3.

The sorting scheme determination unit a7 compares transmission rates of the modulation schemes which the modulation scheme notification signal a801 gives to the wireless transmission units a6 and a61. If the transmission rate of the modulation scheme applied to the wireless transmission unit a6 is larger than that applied to the wireless transmission unit a61, the sorting scheme determination unit a7 determines that the communication condition of the path A is better than that of the path B.

In this case, the sorting scheme determination unit a7 generates the sorting scheme notification signal a701 designating the frame identification method shown in FIG. 6A, and informs the frame sorting unit a3 of it. The frame sorting unit a3 stores the MAC frame with higher priority in the class A buffer a40 using the frame identification method shown in FIG. 6A.

Accordingly, the MAC frame with high priority is transmitted to the wireless transmission device b22 through the path A whose communication condition is better than that of the path B.

Inversely, if the transmission rate of the modulation scheme applied to the wireless transmission unit a61 is larger than that applied to the wireless transmission unit a6, the sorting scheme determination unit a7 determines that the communication condition of the path B is better than that of the path A. In this case, the sorting scheme determination unit a7 generates the sorting scheme notification signal a701 designating the frame identification method shown in FIG. 6B, and informs the frame sorting unit a3 of it. The frame sorting unit a3 stores the MAC frame with higher priority in the class B buffer a50 using the frame identification method shown in FIG. 6B. Accordingly, the MAC frame with high priority is transmitted to the wireless transmission device b22 through the path B whose communication condition is better than that of the path A.

In the third exemplary embodiment, the wireless transmission device a22 includes two buffers in the wireless direction, two wireless transmission units, and two wireless reception units.

However, the number of the buffers in the wireless direction, wireless transmission units and the wireless reception units is not necessarily two. For example, the wireless transmission device may include three buffers in the wireless direction, three wireless transmission units and three wireless reception units. In this case, the buffers in the wireless direction are the class A buffer to the class C buffer and a buffer in the adjacent direction is a class D buffer. The MAC frames stored in the buffers A to C are transmitted from the different wireless transmission units to the opposite wireless transmission devices. The frame sorting unit allocates the MAC frame to the buffers A to C in the wireless direction so that the wireless transmission unit of the better communication condition is used for higher priority indicated by the CoS value. As described above, when the modulation schemes of the wireless transmission units are compared on the basis of the modulation scheme notification signal outputted by the adaptive modulation determination unit, the communication condition of each of the wireless transmission unit may be obtained. If the three buffers in the wireless direction are arranged, the wireless transmission unit which transmits the MAC frame accurately in accordance with the priority of the MAC frame is chosen.

In the third exemplary embodiment, the wireless transmission unit a6 and the wireless reception unit a9 connect with the transmission-reception antenna a15, and the wireless reception unit a9 and the wireless reception unit a91 connect with the transmission-reception antenna a151. However, the transmission-reception antenna of one system may be configured, and the wireless transmission units a6 and a61 and the wireless reception units a9 and a91 may connect with the transmission-reception antenna a15.

As described in the first exemplary embodiment and modified example thereof, the third exemplary embodiment has the same effect as that of the first exemplary embodiment and modified example thereof if the adjacent wireless transmission device is dependently connected therewith.

If the configuration of the first exemplary embodiment and modified example thereof is applied to the wireless transmission system of the third exemplary embodiment, the wireless transmission system of the third exemplary embodiment has the effect that the request for increase and decrease of the transmission capacity of the whole wireless transmission system can be satisfied by only changing the number of the wireless transmission devices, and construction and maintenance are easy.

Fourth Exemplary Embodiment

Figure 7:
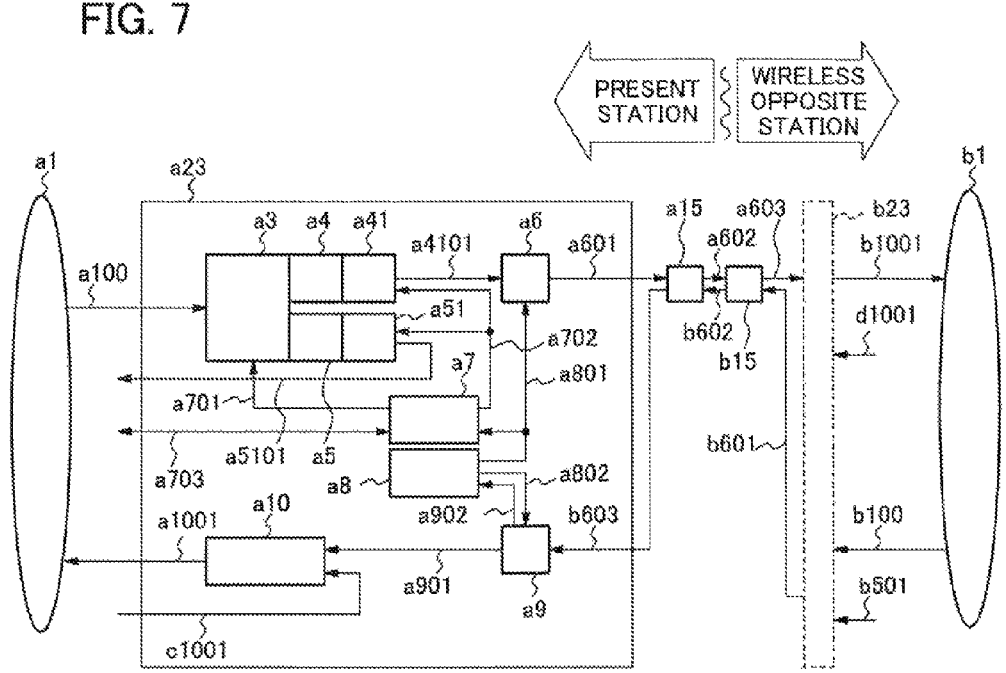
FIG. 7 is a diagram illustrating a configuration of a wireless transmission system of a fourth exemplary embodiment of the present invention.

FIG. 7 is a diagram illustrating a configuration of a wireless transmission system of a fourth exemplary embodiment of the invention.

In the wireless transmission system which performs transmission guaranteeing a transmission band of the MAC frame with priority, when the wireless transmission capacity is reduced due to the adaptive modulation function, a single wireless transmission path may not be able to provide the band to be guaranteed.

FIG. 8A and FIG. 8B are diagrams illustrating a MAC frame identification method in the fourth exemplary embodiment. Operations that the wireless transmission system in FIG. 7 performs band guarantee type priority control using the MAC frame identification method in FIG. 8A and FIG. 8B are described.

FIG. 8A illustrates that the MAC frame with CoS value of 1 requires band guarantee of 100 Mbps in the external input LAN signal a100.

If the transmission capacity between the wireless transmission device a23 and the wireless transmission device b23 is 150 Mbps, the frame sorting unit a3 allocates the external input LAN signal a100 into the class A (wireless direction) and class B (adjacent station direction) using the identification method of the wireless transmission capacity of 100 Mbps to 150 Mbps shown in FIG. 8A.

Communication quality control units a41 and a51 following the class A buffer and the class B buffer perform priority control and band control with respect to the MAC frame of the buffer of each class.

Figure 9:
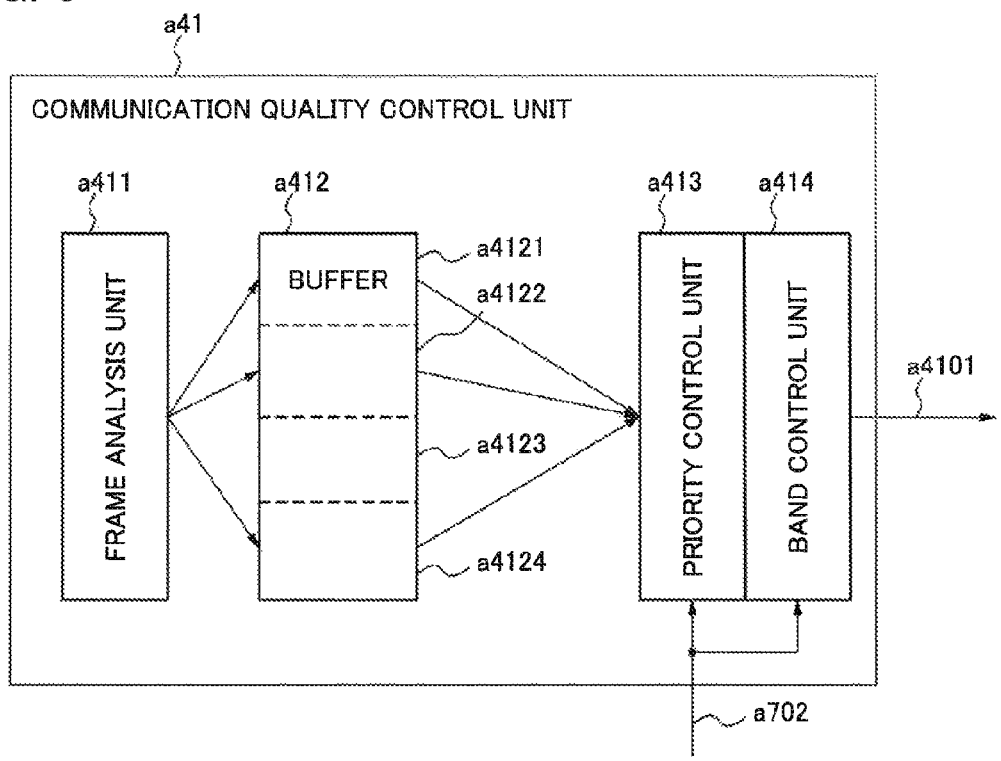
FIG. 9 is a diagram illustrating a configuration of a communication quality control unit of the fourth exemplary embodiment of the present invention.

FIG. 9 is a diagram illustrating the configuration of the communication quality control unit a41. The communication quality control unit a41 includes a frame analysis unit a411, a buffer a412, a priority control unit a413 and a band control unit a414. The buffer a412 is composed of a four independent buffers a4121 to a4124. The MAC frames corresponding to allocation priority classes A1 to A4 shown in FIG. 8A are stored in the buffers a4121 to a4124, respectively.

The frame analysis unit a411 reads out the CoS value of the MAC frame received from the class A buffer. The frame analysis unit a411 stores the MAC frame in any one of buffers a4121 to a4124 depending on the allocation priority classes A1 to A4.

The priority control unit a413 reads out the MAC frame stored in the buffer a412 and outputs it to the band control unit a414.

For example, when the allocation class of the MAC frame is determined based on the identification method shown in FIG. 8A, the MAC frames with four kinds of priority classes A1 to A4 are allocated to the class A buffer a4. The MAC frames with the allocation priorities of classes A1 to A4 are stored in the buffers a4121 to a4124 of the communication quality control unit a41, respectively. That is, the MAC frame with the allocation priority of class A1 is stored in the buffer a4121.

When the identification method shown in FIG. 8A is employed, the wireless transmission device a23 has to transmit the MAC frame with priority of the class A1 at the band of 100 Mbps.

Accordingly, the priority control unit a413 reads out the MAC frame stored in the buffer a4121 so that the band is equal to or greater than 100 Mbps.

When enough transmission capacity still exists after the priority control unit a413 reads out the MAC frame with priority of the class A1 from the buffer a4121, the priority control unit a413 reads out the MAC frames stored in the buffers a4121 to a4124 on the basis of the priorities of the classes A2 to A4.

The priority control unit a413 may read out the MAC frame from the buffer a412 on the basis of the priority designated by a communication quality control signal a702.

The band control unit a414 outputs the MAC frame read out by the priority control unit a413 to the wireless transmission unit a6 at the rate which does not exceed the transmission capacity designated by the communication quality control signal a702.

The wireless transmission device a23 guarantees the transmission band of the MAC frame with the specific CoS value.

Meanwhile, if the wireless transmission capacity of the wireless transmission device a23 is reduced to 80 Mbps due to the adaptive modulation function, the wireless transmission capacity falls below the bandwidth of 100 Mbps which has to be allocated to the frame with the CoS value of 1. In this case, if the current identification method is continued, the frame with the CoS value of 1 is liable to be abandoned in the buffer a41 due to shortage of the wireless transmission capacity. In the wireless transmission system of the fourth exemplary embodiment, the identification method is changed based on the following operations. As a result, in the wireless transmission system of the fourth exemplary embodiment, abandonment of the frame with the CoS value of 1 in the buffer a41 is avoidable.

The sorting scheme determination unit a7 can automatically detect increase or decrease of the wireless transmission capacity on the basis of change of information, included in the modulation scheme notification signal a801, instructing the modulation scheme to the wireless transmission unit a6.

The sorting scheme determination unit a7 instructs the frame sorting unit a3 and the communication quality control units a41 and a51 to employ the identification method in which the wireless transmission capacity is less than 100 Mbps. The frame sorting unit a3 sorts the MAC frame with the CoS value of 1 into the class A buffer on a priority basis.

The frame sorting unit a3 controls the allocation volume of the MAC frame with the CoS value of 1 for the class A buffer so that the data volume of the MAC frame to be stored in the class A buffer a4 does not exceed 80 Mbps in terms of the transmission capacity. As a result, the MAC frame with the CoS value of 1 is stored in the class A buffer a4. If the data volume of the MAC frame stored in the class A buffer a4 exceeds 80 Mbps in terms of the transmission capacity, the frame sorting unit a3 sorts the MAC frame with the CoS value of 1 into the class B buffer a5. Further, when the data volume of the MAC frame stored in the class A buffer a4 falls below 80 Mbps in terms of the transmission capacity, the frame sorting unit a3 stores the MAC frame with the CoS value of 1 into the class A buffer a4 again.

The frame sorting unit a3 sorts all the MAC frames with the CoS value other than 1 into the class B.

The communication quality control unit a41 performs priority control to guarantee the bandwidth of 80 Mbps with respect to MAC frame stored in the class A buffer, and transmits it in the wireless direction.

The communication quality control unit a51 performs priority control to guarantee the bandwidth of 20 Mbps (that is, bandwidth to be guaranteed (100 Mbps) minus wireless transmission capacity (80 Mbps)) with respect to the frame having CoS value of 1 of the frames sorted in the class B. The communication quality control unit a51 performs priority control with respect to the MAC frame with the CoS value other than 1 depending on allocation priority, and transmits it to the adjacent station.

Operations of the communication quality control units a41 and a51 are the same as those of descriptions on FIG. 9.

The sorting scheme determination unit a7 informs an adjacent sorting scheme determination unit in the wireless transmission device c23, which is not shown, of information including the current wireless transmission capacity and the bandwidth to be guaranteed, as a band guarantee notification signal a703.

The sorting scheme determination unit c7 in the wireless transmission device c23 recognizes that the MAC frame with the CoS value of 1 requires band guarantee of 20 Mbps by the band guarantee notification signal a703 received from the wireless transmission device c23. The sorting scheme determination unit c7 informs a communication quality control unit c41 of the contents, as a priority allocation notification signal c702. The communication quality control unit c41 of the wireless transmission device c23 performs priority control of 20 Mbps band guarantee type with respect to the MAC frame in the wireless direction.

In the wireless transmission device c23 which is the adjacent station, because of shortage of the band in the wireless direction, band guarantee of 20 Mbps in the wireless direction with respect to the MAC frame with the CoS value of 1 may be impossible. In such case, the wireless transmission device c23 may further allocate the MAC frame with the CoS value of 1 into another adjacent station by the same operation as that of the wireless transmission device a23 to compensate shortage of the band to be guaranteed.

As explained above, the wireless transmission system of the fourth exemplary embodiment may maintain the transmission capacity using the wireless transmission path of the adjacent station in the wireless transmission device providing band guarantee type priority control. As a result, the wireless transmission system of the fourth exemplary embodiment may continue the band guarantee type priority control even if the wireless transmission capacity is reduced due to the adaptive modulation function, in addition to the effect of the wireless transmission system of the first exemplary embodiment.

By applying the configuration of the modified example of the first exemplary embodiment to the configuration of the wireless transmission system of the fourth exemplary embodiment, the wireless transmission device c23 may further connect with a plurality of wireless transmission devices in series.

On the basis of the configuration above, when the wireless transmission device c23 cannot keep the bandwidth to be guaranteed by using available wireless transmission capacity, it is possible to extend the wireless transmission capacity to be guaranteed further using the wireless transmission path of adjacent wireless transmission device.

The configuration of the wireless transmission system of the fourth exemplary embodiment may be combined with the configuration of the second or the third exemplary embodiment. If the exemplary embodiments are combined, the wireless transmission system of the fourth exemplary embodiment obviously includes the effect of the second or the third exemplary embodiment.

In the first to the fourth exemplary embodiments, the configuration in which the wireless transmission device determines the modulation scheme of the wireless signal by the adaptive modulation scheme is described. In the first to the fourth exemplary embodiments, the wireless transmission unit modulates the wireless transmission LAN signal using the modulation scheme notification signal generated based on the modulation scheme signal included in the reception signal.

However, the present invention is applicable to a wireless transmission device which does not employ the adaptive modulation scheme for determination of the modulation scheme. That is, in the first to the fourth exemplary embodiments, the modulation scheme signal included in the reception signal may not be determined on the basis of the adaptive modulation scheme. The wireless transmission unit in each wireless transmission device may determine the modulation scheme without using the information included in the reception signal. In this case, the sorting scheme determination unit may choose the identification method of the MAC frame on the basis of the modulation scheme determined by the wireless transmission unit. In the first to the fourth exemplary embodiments, the present invention is applied to the wireless transmission device and the wireless transmission system. A target of the present invention is not limited to the wireless transmission. For example, the present invention is applicable to a wired transmission device using a coaxial cable or an optical fiber A wireless transmission system targeted by the present invention is not limited to a system employing a radio wave. The present invention is applicable to a transmission device using an optical space transmission system, for example.

Fifth Exemplary Embodiment

Figure 10:
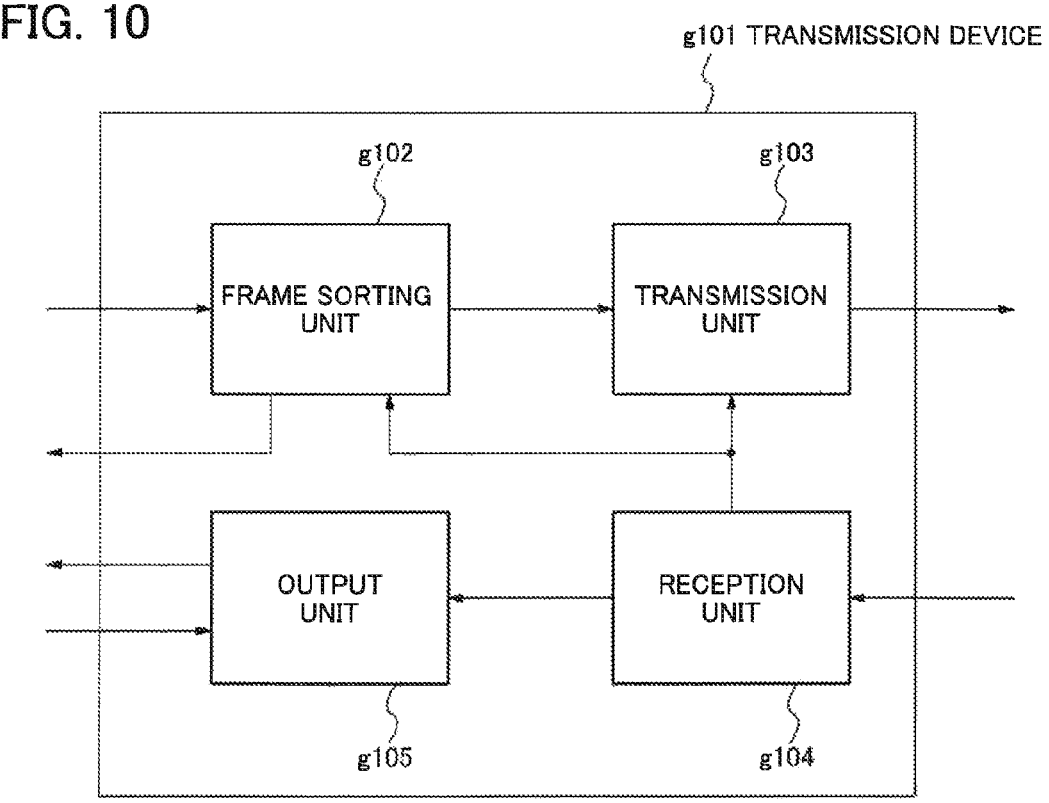
FIG. 10 is a diagram illustrating a configuration of a transmission device of a fifth exemplary embodiment of the present invention.
Figure 11:
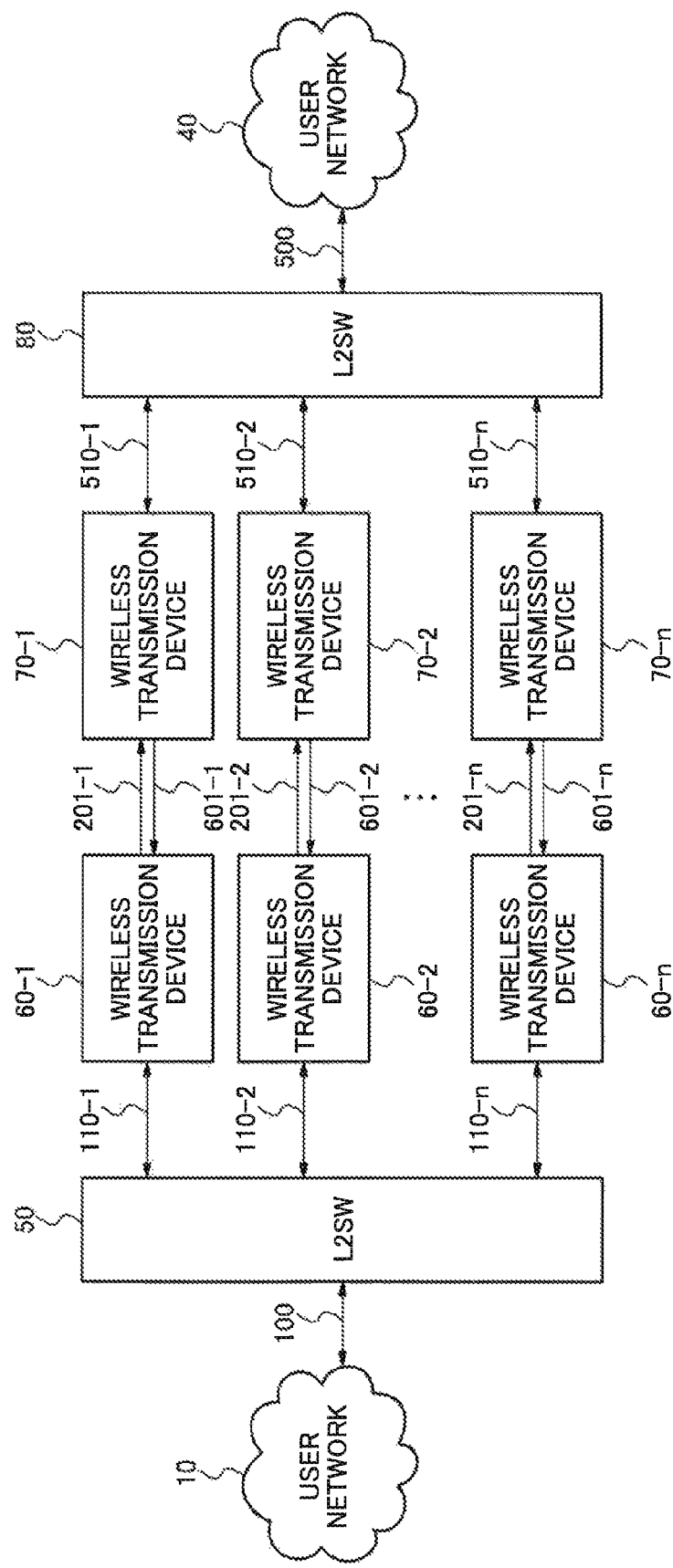
FIG. 11 is a diagram illustrating a configuration of a wireless transmission system related to the present invention.
Figure 12:
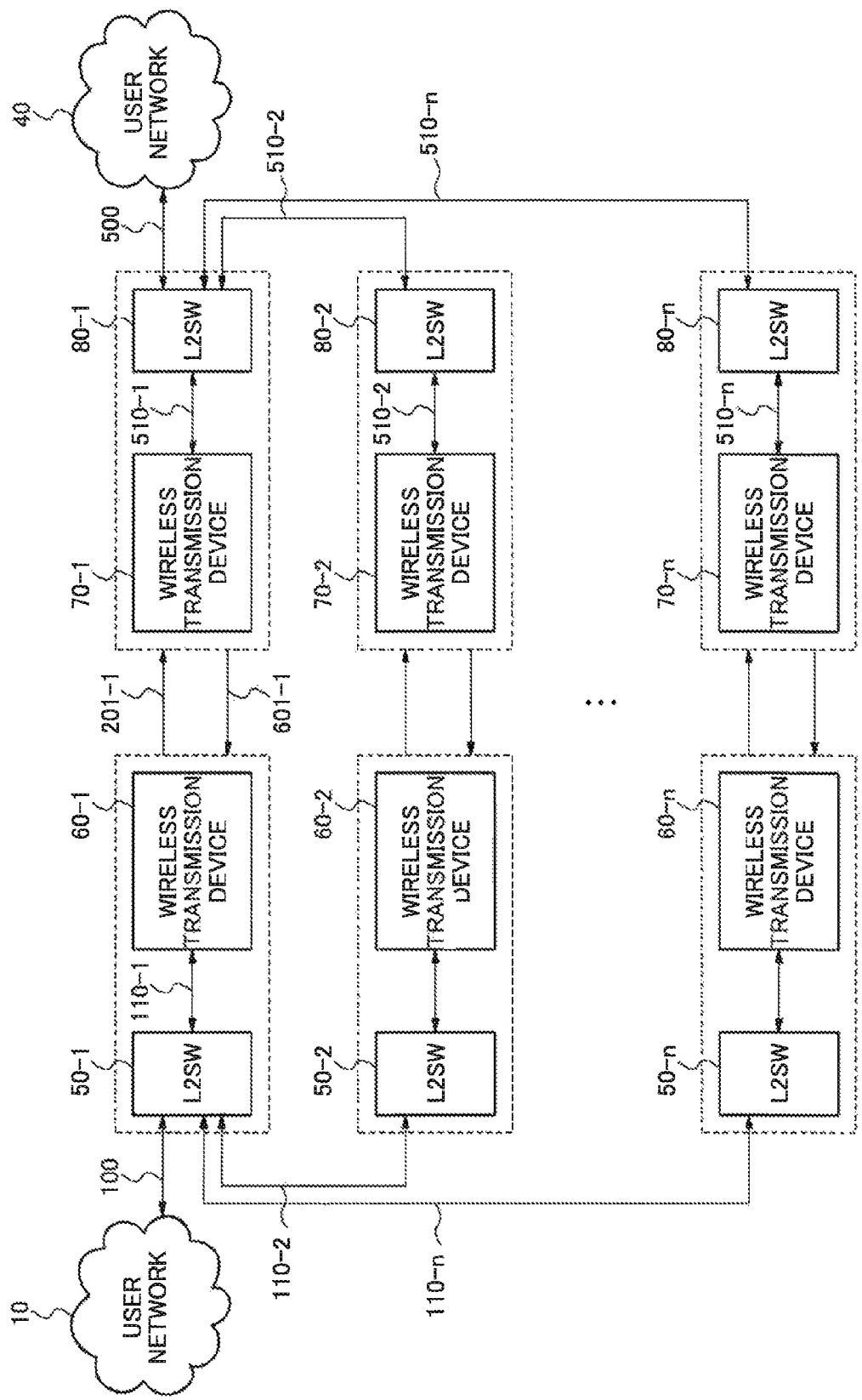
FIG. 12 is a diagram illustrating a configuration of another wireless transmission system related to the present invention.
Figure 13:
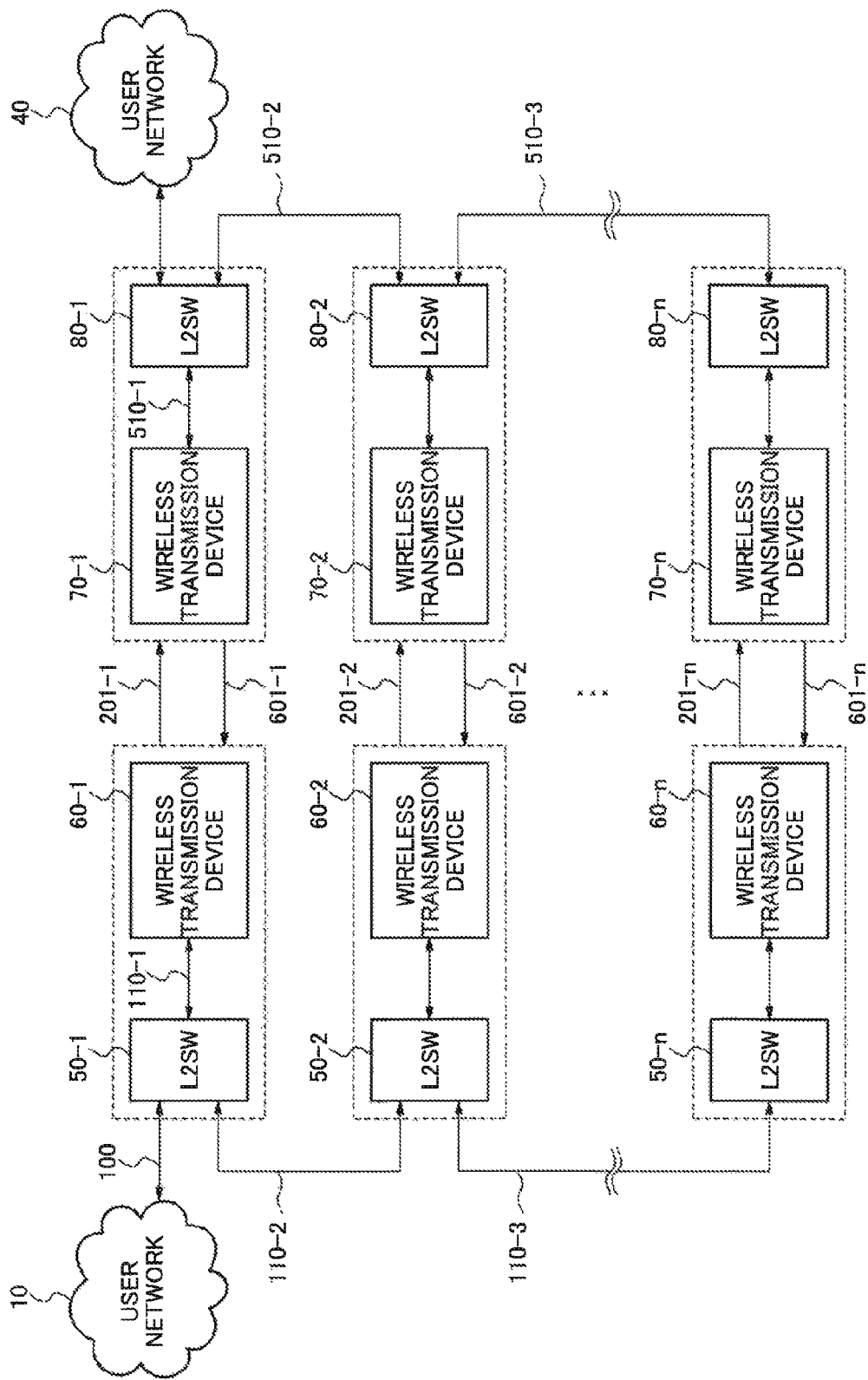
FIG. 13 is a diagram illustrating a configuration of another wireless transmission system related to the present invention.

FIG. 10 is a diagram illustrating a configuration of a transmission device of a fifth exemplary embodiment of the present invention.

A transmission device g101 shown in FIG. 10 includes a sorting unit g102, a transmission unit g103, a reception unit g104, and an output unit g105. The sorting unit g102 allocates a transmission signal into a first path or a second path on the basis of information for allocation of the transmission signal. The transmission unit transmits the transmission signal allocated to the first path as a first signal at a predetermined transmission band. The reception unit g104 outputs a reception signal and information corresponding to a modulation scheme applied to the transmission unit g103, from a received second signal. The output unit g105 generates an output signal from the reception signal and other signal, and outputs the output signal.

In the configuration above, the sorting unit g102 allocates the transmission signal into the first path or the second path on the basis of information of the transmission band corresponding to the modulation scheme for transmission of the first signal. The transmission signal allocated to the second path is outputted to the outside of the transmission device g101.

The sorting unit g102 is capable of allocating the transmission signal to the first path without exceeding the transmission band of the first signal based on the configuration above. The sorting unit g102 can allocate the transmission signal which exceeds the transmission band of the first signal into the second path. The transmission signal allocated to the second path is outputted to the outside of the transmission device g101 to enter a different transmission device having the same configuration as the device, as the transmission signal.

In the different transmission device, based on information for allocation of the transmission signal, the path of the transmission signal may be allocated without exceeding the transmission band of the different transmission device.

The output unit g105 generates the output signal from the reception signal received by the present transmission device and a signal outputted by an output unit of the different transmission device and outputs the output signal. Thereby, the transmission signal before allocation of the path during transmission is restored from the reception signal received by a plurality of transmission devices.

In the transmission device of the fifth exemplary embodiment, since the transmission devices with the same configuration are connected with each other in parallel, a signal jam in the transmission device and occurrence of signal abandonment due to overflow of the high priority signal may be suppressed and the transmission capacity may be extended. By changing the number of the wireless transmission devices, the transmission device of the fifth exemplary embodiment may respond to the request for increase and decrease of the transmission capacity of the whole of the system which occurs with expansion and reduction of the network. The transmission device with the same configuration is available, regardless of the number of the employed transmission devices. As a result, the transmission device of the fifth exemplary embodiment makes construction and maintenance of the transmission system easy.

While having described the present invention referring to the embodiments 1 to 5, the present invention is not limited to the above mentioned embodiments 1 to 5. It is to be understood that to the configurations and details of the present invention, various changes can be made within the scope of the present invention by those skilled in the art.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-044348 filed on Mar. 1, 2010, the disclosure of which is incorporated herein in its entirety by reference.

REFERENCE SIGNS LIST 10, 40 user network
60-1-60-$n$, 70-1-70-$n$ wireless transmission device
50, 80, 50-1-50-$n$, 80-1-50-$n$ L2SW
110-1-110-$n$, 510-1-510-$n$ branched LAN signal
201-1-201-$n$ wireless signal
100, 500 external LAN signal
a1, b1 user network
a10, a101 transmission buffer
a100, b100 external input LAN signal
a15, b15, c15, d15, e15, f15 transmission-reception antenna
a151, b151 transmission-reception antenna
a2, b2, c2, d2, e2, f2 wireless transmission device
a21, b21, c21, d21 wireless transmission device
a22, b22 wireless transmission device
a3 frame sorting unit
a4, a40 class A buffer
a41, a51 communication quality control unit
a401, a4101, a5001, c401 wireless transmission LAN signal
a411 frame analysis unit
a412, a4121, a4122, a4123, a4124 buffer a413 priority control unit
a414 band control unit
a5, a50 class B buffer
a51 communication quality control unit
a5101, b5101 adjacent transmission LAN signal
a501, b501, c501, d501 adjacent transmission LAN signal
a6 wireless transmission unit
a60 class C buffer
a601, a6101, b601, b6101, c601 wireless signal
a602, a6102, b602, b6102, c602 wireless signal
a603, a6103, b603, b6103, c603 wireless signal
e601, e602, e603 wireless signal
d601, d602, d603 wireless signal
f601, f602, f603 wireless signal
a7, c7, e7 sorting scheme determination unit
a701, c701, e701 sorting scheme notification unit
a702 priority allocation notification signal
a703 band guarantee notification signal
a8 adaptive modulation determination unit
a801, c801, e801 modulation scheme notification signal
a802, c802, e802 demodulation scheme notification signal
a9, a91, c9, e9 wireless reception unit
a901, a9101, c901, e901 wireless reception LAN signal
a902, a903, c902, e902 modulation scheme signal
a1001, b1001, c1001, d1001, e1001, f1001 external output LAN signal
g101 transmission device
g102 frame sorting unit
g103 transmission unit
g104 reception unit
g105 output unit

What is claimed is:

1. A transmission device, comprising:
a processor; and
a memory communicatively coupled to the processor and storing instructions, wherein the instructions, when executed by the processor, causes the transmission device to perform operations comprising:
assigning at least a portion of a first signal to either a first path or a second path on the basis of assignment information;
transmitting, using a first transmitting unit, a first portion of the first signal that is allocated to the first path through the first path; and
transmitting, using a second transmitting unit, a second portion of the first signal that is allocated to the second path through the second path;
when an amount of the first portion of the first signal exceeds a transmission limit of a modulation scheme of the first transmitting unit, allocating an excess amount of the first portion of the first signal corresponding to an amount of the first portion of the first signal that exceeds the transmission limit to the second path.

2. The transmission device of claim 1, wherein the assignment information is determined on the basis of the modulation scheme of the first transmitting unit.

3. The transmission device of claim 1, wherein the assignment information includes information on an identifier for identifying a frame of the first signal.

4. The transmission device of claim 1, wherein the first path is for transmitting the first signal that is allocated to the first path to an opposite transmission device.

5. The transmission device of claim 1, wherein the second path is for transmitting the first signal that is allocated to the second path to an adjacent transmission device.

6. The transmission device of claim 1, wherein the first path includes a plurality of paths connecting with the first transmission unit, and the operations comprise allocating the first portion of the first signal that is allocated to the first path for each of the plurality of paths on the basis of the assignment information.

7. The transmission device of claim 1, wherein the first transmission unit transmits the first portion of the first signal in a wireless transmission system.

8. The transmission device of claim 1, wherein the first transmission unit includes a redundant configuration.

9. The transmission device of claim 1, wherein the operations comprise:
receiving a second signal and outputting information for determining the modulation scheme of the first transmitting unit on the basis of information included in the second signal.

10. A transmission device, comprising:
a processor; and
a memory communicatively coupled to the processor and storing instructions, wherein the instructions, when executed by the processor, causes the transmission device to perform operations comprising:
assigning at least a portion of a first signal to either a first path or a second path on the basis of assignment information;
transmitting, using a first transmitting device, a first portion of the first signal that is allocated to the first path through the first path;
transmitting, using a second transmitting device, a second portion of the first signal that is allocated to the second path through the second path; and
receiving a second signal and outputting information for determining a modulation scheme of the first transmitting device on the basis of information included in the second signal,
wherein the information included in the second signal includes information on the modulation scheme of the first transmitting unit that is determined using an adaptive modulation scheme.

11. A transmission system, comprising:
first and second transmission devices, the first transmission device comprising:
a processor; and
a memory communicatively coupled to the processor and storing instructions, wherein the instructions, when executed by the processor, causes the transmission device to perform operations comprising:
assigning at least a portion of a first signal to either a first path or a second path on the basis of assignment information;
transmitting, using a first transmitting device, a first portion of the first signal that is allocated to the first path through the first path;
transmitting, using a second transmitting device, a second portion of the first signal that is allocated to the second path through the second path; and
receiving a second signal and outputting information for determining a modulation scheme of the first transmitting device on the basis of information included in the second signal,
wherein the information included in the second signal includes information on the modulation scheme of the first transmitting device that is determined using an adaptive modulation scheme,
wherein:

the first transmission device transmits the first portion of the first signal that is allocated to the first path from the first transmission unit to the second transmission device and receives the second signal from the second transmission device, and the second transmission device receives the first portion of the first signal that is allocated to the first path that the first transmission device transmits, and transmits the second signal to the first transmission device.

12. The transmission system of claim 11, further comprising third and fourth transmission devices, wherein:

the third transmission device receives the second portion of the first signal that the first transmission device allocates to the second path and transmits the second portion of the first signal received from the first transmission device to the fourth transmission device, the third transmission device receives a signal that the fourth transmission device transmits and transmits the signal received from the fourth transmission device to the first transmission device.

13. A transmission method, implemented by a processor, comprising:

assigning, by the processor, at least a portion of a first signal to either a first path or a second path on the basis of assignment information;

transmitting a first portion of the first signal that is allocated to the first path through the first path;

transmitting a second portion of the first signal that is allocated to the second path through the second path; and receiving a second signal an outputting information for determining a modulation scheme that is used when the first portion of the first signal is transmitted through the first path on the basis of information included in the second signal, wherein the information included in the second signal includes information on the modulation scheme that is determined using an adaptive modulation scheme.

14. The transmission method of claim 13, wherein the assignment information is determined on the basis of the modulation scheme that is used when the first portion of the first signal is transmitted through the first path.

15. The transmission method of claim 13, wherein the assignment information includes information on an identifier for identifying a frame of the first signal.

* * * * *